United States Patent
Yu

(10) Patent No.: US 6,207,754 B1
(45) Date of Patent: Mar. 27, 2001

(54) LOW MODULUS THERMOPLASTIC OLEFIN COMPOSITIONS

(75) Inventor: Thomas Chen-Chi Yu, Bellaire, TX (US)

(73) Assignee: Exxon Chemical Patents, Inc., Houston, TX (US)

( * ) Notice: Subject to any disclaimer, the term of this patent is extended or adjusted under 35 U.S.C. 154(b) by 0 days.

(21) Appl. No.: 08/864,954

(22) Filed: May 29, 1997

(51) Int. Cl.$^7$ .............................. C08F 10/02; C08F 10/06
(52) U.S. Cl. ..................... 525/133; 525/145; 525/191; 525/196; 525/232; 525/240; 428/523
(58) Field of Search ........................................ 525/232, 240, 525/133, 145, 191, 196; 428/523

(56) References Cited

U.S. PATENT DOCUMENTS

| | | | |
|---|---|---|---|
| 4,521,566 | 6/1985 | Galli et al. | 525/247 |
| 4,895,903 | 1/1990 | Kobayashi et al. | 525/133 |
| 5,017,714 | 5/1991 | Welborn, Jr. | 556/12 |
| 5,162,445 | 11/1992 | Powers et al. | 525/333.4 |
| 5,266,392 | * 11/1993 | Land et al. | 428/224 |
| 5,324,820 | 6/1994 | Baxter | 530/350 |
| 5,391,618 | * 2/1995 | Yamamoto et al. | 525/88 |
| 5,747,592 | * 5/1998 | Huff et al. | 525/191 |
| 5,777,020 | * 7/1998 | Nagi et al. | 524/451 |

FOREIGN PATENT DOCUMENTS

| | | |
|---|---|---|
| 0 702 032 | 3/1996 | (EP) . |
| 0 774 489 | 5/1997 | (EP) . |
| WO 96/19533 | 6/1996 | (WO) . |

OTHER PUBLICATIONS

ASTM D 790–96 "Standard Test Methods for Flexural Properties of Unreinforced and Reinforced Plastics and Electrical Insulating Materials".
ASTM D 1238–95, "Standard Test Method for Flow Rates of Thermoplastics by Extrusion Plastometer".
ASTM D 1646–96a, "Standard Test Methods for Rubber—Viscosity, Stress, Relaxation, and Pre–Vulcanization Characteristics (Mooney Viscometer)".
ASTM D 792–91, "Standard Test Methods for Density and Specific Gravity (Relative Density) of Plastics by Displacement".
ASTM D 2240–95, "Standard Test Method for Rubber Property—Durometer Hardness".
ASTM D 638–96, "Standard Test Method for Tensile Properties of Plastics".
ASTM D 412–92, "Standard Test Methods for Vulcanized Rubber and Thermoplastic Rubbers and Thermoplastic Elastomers—Tension".
ASTM D 635–91, "Standard Test Method for Tear Strength of Conventional Vulcanized Rubber and Thermoplastic Elastomers".
"Impact Modification of Polypropylenes with EXACT™ Plastomers", T. C. Yu, Presented at Society of Plastics Engineers (SPE), 52nd Annual Technical Conference (ANTEC), San Francisco CA, May, 1994.

* cited by examiner

Primary Examiner—Jeffrey C. Mullis
(74) Attorney, Agent, or Firm—John E. Schneider; Charles E. Runnyan; Stephen D. Prodnuk

(57) ABSTRACT

This invention relates to thermoplastic olefin compositions of a low modulus which are suitable for fabrication into flexible skins and liners for applications which heretofore have been serviced by skins and liners produced essentially only from plasticized polyvinyl chloride resin compositions. TPO compositions of this invention comprise an impact modified polypropylene resin and a "plastomer" resin intimately blended in proportions with respect of one to another to provide a blend composition having a 1% secant modulus of less than 40,000 psi, and preferably less than 30,000 psi. Optionally, and preferably, the blend also comprises as a discrete component apart from the impact modified polypropylene an olefin copolymer elastomer or a cross-linked elastomer concentrate. Optionally the blend may contain other polyolefin components to alter its stiffness in desirable ways. In addition to the olefin based polymer components, the blend may further comprise, and preferably does comprise, a coupling agent and activator compound which, during melt compounding of the blend components causes the plastomer to extend to its dimer form and, when a discrete OCE component is present to couple the plastomer thereto.

9 Claims, 11 Drawing Sheets

LOW MODULUS THERMOPLASTIC OLEFIN COMPOSITIONS

CROSS-REFERENCE TO RELATED APPLICATIONS

Not Applicable.

STATEMENT REGARDING FEDERALLY SPONSORED RESEARCH

Not Applicable.

1. Field of the Invention

This invention relates to thermoplastic olefin compositions of a low modulus which are suitable for fabrication into flexible skins and liners for applications which heretofore have been serviced by skins and liners produced essentially only from plasticized polyvinyl chloride resin compositions.

2. Background of the Invention

Thermoplastic elastomers (TPEs) are an important class of polymeric composition which are particularly useful in producing durable components through conventional extrusion or injection molding processes. Typically a TPE is a blend of thermoplastic polymer and a cured elastomer (rubber). Articles may be produced from a TPE that have a behavior similar to a cured elastomer but the composition has the advantage, compared to a rubber (elastomer) resin, that the TPE undergoes plastic flow above the softening point of the thermoplastic polymer component of the blend. This permits TPEs to be used in component fabrication through common polymer processing techniques, such as injection molding techniques to produce finished articles having resilient rubber-like properties without the need for a vulcanizing cure of the finished article. This provides TPEs with an advantage compared to conventional curable elastomers because conventional curable elastomers are tacky, do not undergo plastic flow at elevated temperatures and therefore cannot be fabricated into finished article forms by an extrusion or injection molding technique.

The components for a thermoplastic elastomer (TPE) blend may be formed as a reactor blend of a thermoplastic polymer and an uncured elastomer—with the thermoplastic polymer and the elastomer being simultaneously formed by different catalysts in a single reactor vessel—or the respective thermoplastic polymer and elastomer components for the blend may be separately prepared and then melt blended, generally by a high shear mixing technique. The elastomeric component of a TPE may be precured or cured in situ by a curing agent added during its melt blending with the thermoplastic polymer component. When the elastomer component of a TPE is cured during blending with the thermoplastic polymer component, the TPE may also be referred to as an "alloy" and/or as a "dynamically vulcanized alloy."

When both the thermoplastic polymer component and the elastomer component are composed of olefin monomeric units, the resulting TPE is often referred to as a thermoplastic olefin (TPO). Thermoplastic olefin elastomer compositions (TPOs) are a class of TPEs based predominately or wholly on olefin polymers. A typical TPO is a melt blend or reactor blend of a polyolefin plastic, typically a propylene polymer, with an olefin copolymer elastomer (OCE), typically an ethylene-propylene rubber (EPM) or an ethylene-propylene-diene rubber (EPDM). The polyolefin plastic imparts to the TPO the temperature resistance and rigidity typical of that thermoplastic resin while the olefin copolymer elastomer imparts flexibility, resilience and toughness to the TPO. For example, a propylene homopolymer or random copolymer having at least 95 wt. % propylene content with an alpha-olefin comonomer content no greater than about 5 wt. % is a thermoplastic polymer which when blended by reactor or melt compounding with an ethylene-propylene rubber (EPM) or an ethylene-propylene-diene (EPDM) rubber results in a composition that would properly be called a thermoplastic olefin. Wherein such EPM or EPDM comprises not more than about 20 wt. % of this propylene polymer blend, this TPO composition is typically referred to as an impact modified polypropylene (im-PP).

For many purposes, such as enhanced weatherability, low temperature impact strength and reduced material cost, a TPO form of TWE composition may be and is preferred, provided that the TPO composition can be formulated to have a set of properties which will meet the service needs for its intended end use application. For example, TPOs that are impact modified polypropylenes are particularly well suited for producing resilient structures, such as body parts for automotive applications like bumper covers, air dams, and other trim parts, etc. The capability of such TPOs to be injection molded makes them particularly attractive for high volume production necessary in automotive body part applications. However, for other end use applications, such as for production of skin and/or liner articles—such as dash board and interior door panel skin surface layers in the automotive industry or as geomembranes and/or reinforced roof membrane liners—impact modified polypropylenes (im-PP) heretofore known have been found wanting in their properties, and have not been adopted for applications such as skins and/or liners. Chief among the deficiencies of the heretofore known im-PP compositions that has forestalled their adoption for use as skins/liners has been the stiffness-flexible softness-conformability properties of skins and liners formed of such compositions, as indicated by the 1% secant modulus property of the base composition (as measured per ASTM D-790 on injection molded test specimens). Generally, TPEs, and particularly TPOs in the nature of impact modified polypropylenes, have a 1% secant modulus (hereinafter "secant modulus") significantly exceeding 30,000 psi (200 MPa). Further, the potential expedient of increasing the content of the EPM or EPDM component of a polypropylene TPO blend to levels greater than about 20 wt. % to further reduce its secant modulus is not viable in practice since higher elastomer contents tend to render the blend to be too tacky for convenient processing and can even lead to a phase inversion of the blend that detracts from the other physical properties of an im-PP.

Many service applications require a skin and/or liner to be very compliant or flexible in order to finally conform or fashion the skin or liner about the contours of that substrate to which it must be affixed to form the finished article. Hence, many applications require a skin or layer, the resin base of which is both resilient while being flexible and compliant. This property requirement for such a skin or liner translates to a secant modulus not exceeding and generally significantly less than about 30,000 psi (200 MPa) for the base resin from which the skin or liner is to be fabricated. And this low secant modulus must be accomplished without sacrificing the other properties that would make the resin seem suitable or desirable for production of a skin/liner such as automotive door skins and instrument panel skins. In the fabrication process these skins need to be embossed with desirable surface patterns, and subsequently formed into the final contours by various processes such as low pressure molding or vacuum forming. Grain retention of the embossed patterns on such skins during fabrication is therefore essential. During thermoforming, the heated skin needs to stretch rapidly during deep drawing while maintaining the embossed grain patterns. To date, plasticized polyvinyl chloride compositions have been essentially the only resin that has been found to meet this low secant modulus service requirement while also retaining its other properties required for service as a skin/liner.

The use of plasticized polyvinyl chloride (PVC) for service as a flexible skin or liner is not without its disadvantages. First, the plasticizer required to impart compoundability to the PVC resin so that it may in the first instance be fabricated into the form of a skin/liner—a high surface area article form—tends over time to migrate to the surface of the skin/liner and emits therefrom as an odor (i.e., the "new car" smell for example) which may or may not be objectionable to a user of the finished article. The continued loss over service lifetime of plasticizer from the PVC layer promotes hairline cracks, which in time can lead to the eventual failure of the PVC skin. By comparison to olefin based resins, a PVC resin is of 30–40% greater density; meaning that to fabricate a skin/liner of a given dimension of length, width and thickness, 30–40% more mass is required with a PVC resin than would be the case if an olefin based resin could instead be utilized. Further, to join one skin/liner section to another skin/liner section—an installation act often required in the field—requires a tedious process of solvent welding when the skin/liner is formed of a plasticized PVC resin since PVC is not a heat weldable resin. With an olefin based resin, such installation could readily be accomplished by heat welding with a portable hot gun if a TPO composition could otherwise be used for service as a skin/liner article. Unfortunately, skins/liners formed of present day TPO compositions are too stiff and lacking in compliability, (as indicated by their high secant modulus properties of the TPO resin) to be readily and easily formed about the contours of an article as to which they would form the skin/liner layer and hence, have not heretofore been adopted for these end use applications.

It is still a desire in the art to develop a TPO composition that has a secant modulus similar to that of a flexible plasticized PVC—that is, a secant modulus less than about 40,000 psi, and particularly less than about 30,000 psi—without otherwise sacrificing the other beneficial mechanical/physical/chemical properties of a TPO composition which would render it suitable and/or superior in service as a flexible skin/liner for those applications where heretofore a plasticized PVC resin has been the only acceptable resin for use.

SUMMARY OF THE INVENTION

This invention provides a TPO composition which is drop-in replacement for flexible PVC, such that the identical calendering equipment can be used to fabricate TPO skins and liners with adjustment in processing temperature and speed, etc. only, and with minor hardware modifications.

A TPO composition has been discovered which has a flexural modulus (1% secant modulus) of 40,000 psi or less which may be fabricated to have a desired melt flow ratio (OR) value within the range of 0.5 to 5 while still offering superior properties such as strength, impact and puncture resistance, etc. as compared to flexible plasticized PVC compositions of a low secant modulus heretofore used for production of skins and liners. The TPO compositions of this invention are especially suitable for applications which heretofore have been practically serviceable only by a plasticized PVC composition and, by comparison to such plasticized PVC composition, the TPOs of this invention have the advantage of being: odor free in that there is no migration of a plasticizer to the surface of articles fabricated therewith; of lower density, to enable production of a skin or membrane article of comparable dimensions with less material; and able to provide articles that are joinable to each other by heat welding, thereby eliminating the need for solvent welding as with flexible PVC compositions. The TPO compositions of this invention are particularly adapted to serve as automotive interior skins, such as instrument panels and door trim panels, and as industrial liners such as in geomembranes and reinforced roof membranes.

TPO compositions of this invention comprise an impact modified polypropylene resin and a "plastomer" resin intimately blended in proportions with respect of one to another to provide a blend composition having a 1% secant modulus of less than 40,000 psi, and preferably less than 30,000 psi. Optionally, and preferably so, TPO blend compositions of this invention further comprise, as a discrete blend component apart from any impact modifying elastomer content of the impact modified polypropylene, a discrete olefin copolymer elastomer (OCE) resin intimately blended with the impact modified polypropylene and plastomer components to further reduce flexural modulus of the resulting blend product. To enhance grain retention and deep draw thermoforming, the discrete OCE component may be cross-linked to bolster the melt strength of the TPO skin during processing. Further, the TPO blend compositions of this invention optionally further comprise, and preferably so, a coupling agent and activator compound which, upon melt compounding of the plastomer with the impact modified polypropylene component, produces an end to end coupling of plastomer to produce dimers thereof and, when present, to couple the plastomer to the optional discrete OCE, during melt compounding of the blend components to yet further significantly reduce the flex modulus of the resulting TPO blend.

By appropriate selection of the melt flow rates of the impact modified polypropylene component and of the plastomer component, the resulting TPO blend composition may be prepared to have any desired MFR for purpose of its subsequent processing into skin and/or liner layers or other finished article forms all while having a reduced 1% secant modulus value which renders the TPO composition suitable for fabrication into flexible skin/liner articles which are of similar compliability and flexibility as skin/liners heretofore prepared by plasticized PVC compositions.

The low secant modulus TPO compositions of this invention essentially retain the other superior physical/mechanical/chemical properties of the impact modified polypropylene component thereof, yet the TPO of this invention remains non-tacky and free flowing when in pelletized form so that it may be processed in conventional fashion as if it were a typical thermoplastic resin. Particularly, TPO compositions of this invention can be directly used in equipment and lines now used to produce flexible PVC skins/liners without any difficulties of handling and yet produce skins/liners of superior use properties compared to plasticized PVC skins/liners. A skin/liner is a sheet-like layer of a thickness of at least about 0.005 inch.

DESCRIPTION OF THE PREFERRED EMBODIMENTS

Figure 1:
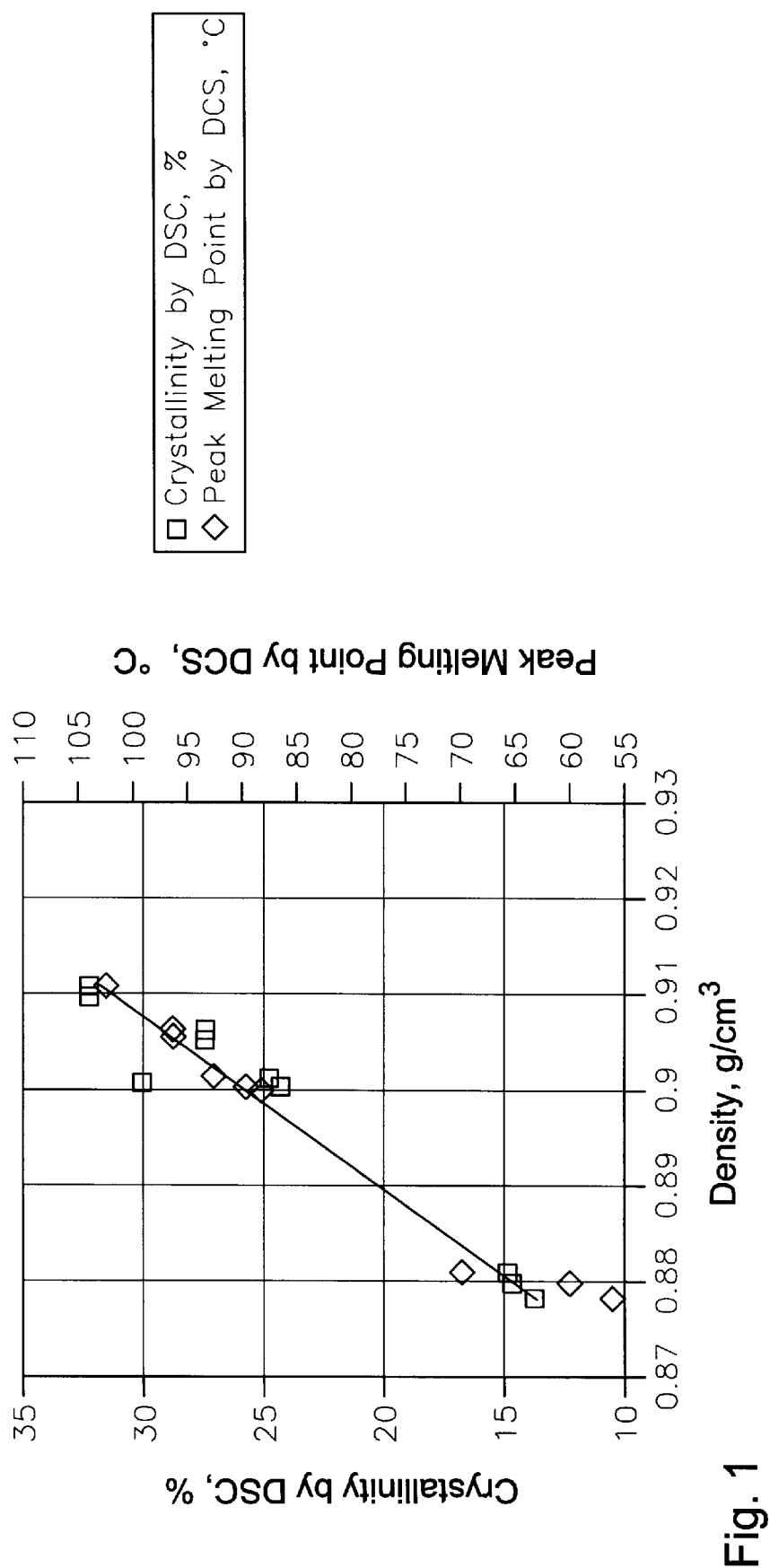
FIG. 1 is a three-coordinate plot of the peak melting point temperature (by DSC) and crystallinity (by DSC) versus the density of an ethylene-butene plastomer. For plastomers prepared with other comonomer types, the trends herein demonstrated for an ethylene-butene plastomer will be the same although the precise values of the peak melting point-density coordinates and the crystallinity coordinate will vary somewhat as a function of the comonomer type.

TPO compositions of this invention are comprised of at least three components; a propylene polymer, an OCE and a plastomer. The propylene polymer and OCE may be supplied as separate polymeric components, or may be preformed as an impact polypropylene resin, to which the plastomer is supplied. Optionally, but preferably so when an impact polypropylene resin is employed, a further quantity of OCE discrete from and in addition to that supplied by the impact polypropylene is employed in preparing TPO blends of this invention. When a further quantity of OCE discrete from that of the impact polypropylene resin is utilized, it is preferably precured or cross-linked as an OCE concentrate in a small quantity of propylene polymer and it is this precured OCE-propylene polymer concentrate which is added to the impact propylene and plastomer components in an amount that supplies the further quantity of OCE that is desired, after which the impact polypropylene, plastomer and further quantity of OCE are melt compounded to a uniform blend. Optionally, but preferably so, a coupling agent and activator compound therefor are added in appropriate amounts to the impact polypropylene, plastomer and optional additional quantity of discrete OCE so that upon melt compounding of these components the plastomer undergoes an end to end coupling with itself to form plastomer dimers and/or the plastomer undergoes coupling to the further quantity of OCE added.

However prepared, whether as a blend of individual propylene polymer, OCE and plastomer components or as a blend of impact polypropylene resin, plastomer and an optional quantity of additional discrete OCE, the final TPO blends of this invention will, on a total olefin monomer content basis, contain from about 37 to about 51 weight % propylene units ($C_3H_6$); from about 41 to about 52.5 weight % ethylene units ($C_2H_4$); from about zero to about 0.5 weight % diene units; and the balance will be from about 8 to about 10 weight % of units derived from a $C_{4-8}$ α-olefin.

Compositions of this invention are TPOs having a relatively low 1% secant modulus, namely less than 40,000 and preferably less than 30,000 psi. The composition comprises a blend of an impact modified polypropylene thermoplastic and a plastomer component. Optionally, and preferably, the blend also comprises as a discrete component apart from the impact modified polypropylene an olefin copolymer elastomer. Preferably the OCE added will ultimately become cross-linked in order to improve the melt strength of the final TPO blend. Cross-linking of the OCE to improve melt strength can be accomplished in two ways. The correct amount of cross-linking agent can be added during the blend mixing step. However, in order to complete the cross-linking reaction, a prolonged mixing time which would add from two to five minutes cycle time would be required. Another method is the employment of a cross-linked concentrate of the OCE which is produced in a separate operation. The concentrate contains a minor amount or propylene polymer in order to facilitate the dispersion of the cross-linked OCE in the basic impact modified polypropylene and plastomer mixture.

In addition to the olefin based polymer components, the blend may further comprise, and preferably does comprise, a coupling agent and activator compound which, during melt compounding of the blend components causes the plastomer to extend to its dimer form and, when a discrete OCE component is present to couple the plastomer thereto. Inclusion of a coupling agent and activator compound to produce coupling of the plastomer to itself and/or to the discrete OCE component has been found to further significantly reduce the 1% secant modulus of the TPO blend compared to an otherwise comparable blend not including a coupling agent and activator compound.

The final TPO blend may be produced to have an MFR value desired for its fabrication by selection of impact modified polypropylene and plastomer components of appropriate MFR values such that in the proportions that one is blended with the other to produce the desired 1% secant modulus value of the TPO blend the MFR value desired for the final blend is achieved.

The Impact Modified Polypropylene Thermoplastic Component

The impact modified polypropylene component for the blend is itself a TPO blend of a propylene polymer and an elastomer, preferably an olefin copolymer elastomer, wherein the elastomer content is less than 20 wt. % of the impact modified polypropylene blend. The propylene polymer constituent of the impact modified polypropylene is a homopolymer or a random copolymer of propylene having a propylene content of at least 95 wt. % and a weight average molecular weight of at least 70,000. The propylene polymer, when a random copolymer is a copolymer of propylene with an ethylene or a $C_4$–$C_6$ alpha-olefin comonomer wherein the comonomer content does not exceed about 7 wt. % of the random copolymer. As a constituent apart from the OCE with which it is blended for impact modification, the propylene polymer is highly stereoregular, either isotactic or syndiotactic regularity, with isotactic regularity being preferred. The OCE component of the impact modified polypropylene is preferably an ethylene-propylene rubber/elastomer of an ethylene content of from about 30 to about 70 wt. %, and density of from about 0.86 to about 0.89 g/cc and a Mooney viscosity (1+4 at 125° C.) from about 20 to 70. Other OCE elastomers which can withstand the high compounding and subsequent processing temperature for TPO compounds may be used. Two examples of heat stable OCEs are isobutylene-paramethylstyrene copolymer elastomers or the brominated isobutylene-paramethylstyrene copolymer elastomers detailed descriptions of which are given in U.S. Pat. No. 5,162,445. The preferred brominated isobutylene-paramethylstyrene copolymer elastomer should have a bromine content of 0.3 to 1% by weight, and a Mooney viscosity (1+8 at 125°) from about 35 to 55, and a paramethylstyrene content from about 5 to about 10 wt. %.

The impact modified polypropylene may be prepared as a reactor blend wherein the isotactic propylene polymer or random propylene copolymer and impact modifying OCE constituents are simultaneously formed by polymerization of propylene with another appropriate olefin comonomer in different zones of the same reactor or in a single reaction zone in the presence of differing catalysts, one of which is appropriate to formation of the propylene polymer constituent, while the other is appropriate to the formation of the OCE constituent—as is known in the art. Alternatively, the impact modified polypropylene may be formed by melt compounding of a propylene polymer with an OCE, each of which were separately formed prior to blending. Generally, for reasons of economy, impact modified polypropylenes are prepared as reactor blends and for this reason generally have an impact modifying OCE content not exceeding about 20 wt. % of the reactor blend, and more typically not exceeding about 12 wt. % of the reactor blend. Further discussion of the particulars of an impact modified polypropylene may be found in U.S. Pat. No. 4,521,566.

However the impact modified polypropylene is formed, it generally comprises from about 80 to about 90 wt. % of a propylene polymer and from about to about 20 wt. % of an OCE such that the propylene content of the blend is at least about 80 wt. %; it has a 1% secant modulus of from about 60,000 psi to about 130,000 psi; and a MFR of from about 0.5 to about 5.0 and preferably from about 0.5 to about 3.

THE PLASTOMER COMPONENT

The plastomer component for the TPO blends of this invention is an ethylene based copolymer, meaning that its major constituent by weight or mole % is ethylene, and is prepared with a single sited catalyst, i.e., a catalyst the transition metal components of which is an organometallic compound at least one ligand of which has a cyclopentadienyl anion structure through which such ligand bondingly coordinates to the transition metal cation. Such a catalyst system, now commonly known as "metallocene" catalyst, produces ethylene copolymers in which the comonomer is more randomly distributed within a molecular chain and also more uniformly distributed across the different molecular weight fractions comprising the copolymer than has heretofore generally been possible to obtain with traditional types of heterogeneous multi-sited Ziegler-Natta catalysts. Metallocene catalysts are further described in U.S. Pat. Nos. 5,017,714 and 5,324,820.

In its polymeric properties, a plastomer is neither completely like a thermoplastic nor completely like an elastomer, nor is it totally unlike either. An ethylene based polymer may exhibit thermoplastic properties or elastomeric properties dependent upon its degree of crystallinity, density and molecular weight. For example, homopolyethylene is a thermoplastic and has a density of between about 0.940 to about 0.965 g/cc depending upon its particular degree of crystallinity which in turn relates to its degree of chain branching. A substantially linear polyethylene is one essentially free of any long chain branching and when substantially free of short chain branching is the most crystalline and of highest density. As short chain branching of a polyethylene structure increases, its crystallinity and density decreases. Polymerization of ethylene with a comonomer, such as a $C_3$–$C_8$ alpha-olefin, adds short chain branching to the polymer chain, hence decreases the crystallinity and density of the resulting copolymer as the content of incorporated comonomer increases. Wherein the comonomer content reaches and exceeds about 10 wt. %, the ethylene copolymer product, if of sufficient molecular weight, exhibits both plastic and elastomeric characteristics. In the continuum of increasing comonomer content, a region exists defined by the comonomer content and molecular weight wherein an ethylene copolymer which is produced with a metallocene catalyst is neither totally thermoplastic-like nor elastomer-like in respect to its properties but is partially like a thermoplastic and partially like an elastomer. For purposes of this application, an ethylene copolymer produced with a metallocene catalyst which has a comonomer content and molecular weight that falls within this region—hence has a density lower than that of a linear low density polyethylene (LLDPE) thermoplastic polymer and approaching and/or even somewhat overlapping with that of an ethylene containing copolymer elastomer/rubber—is referred to as a "plastomer."

Figure 2:
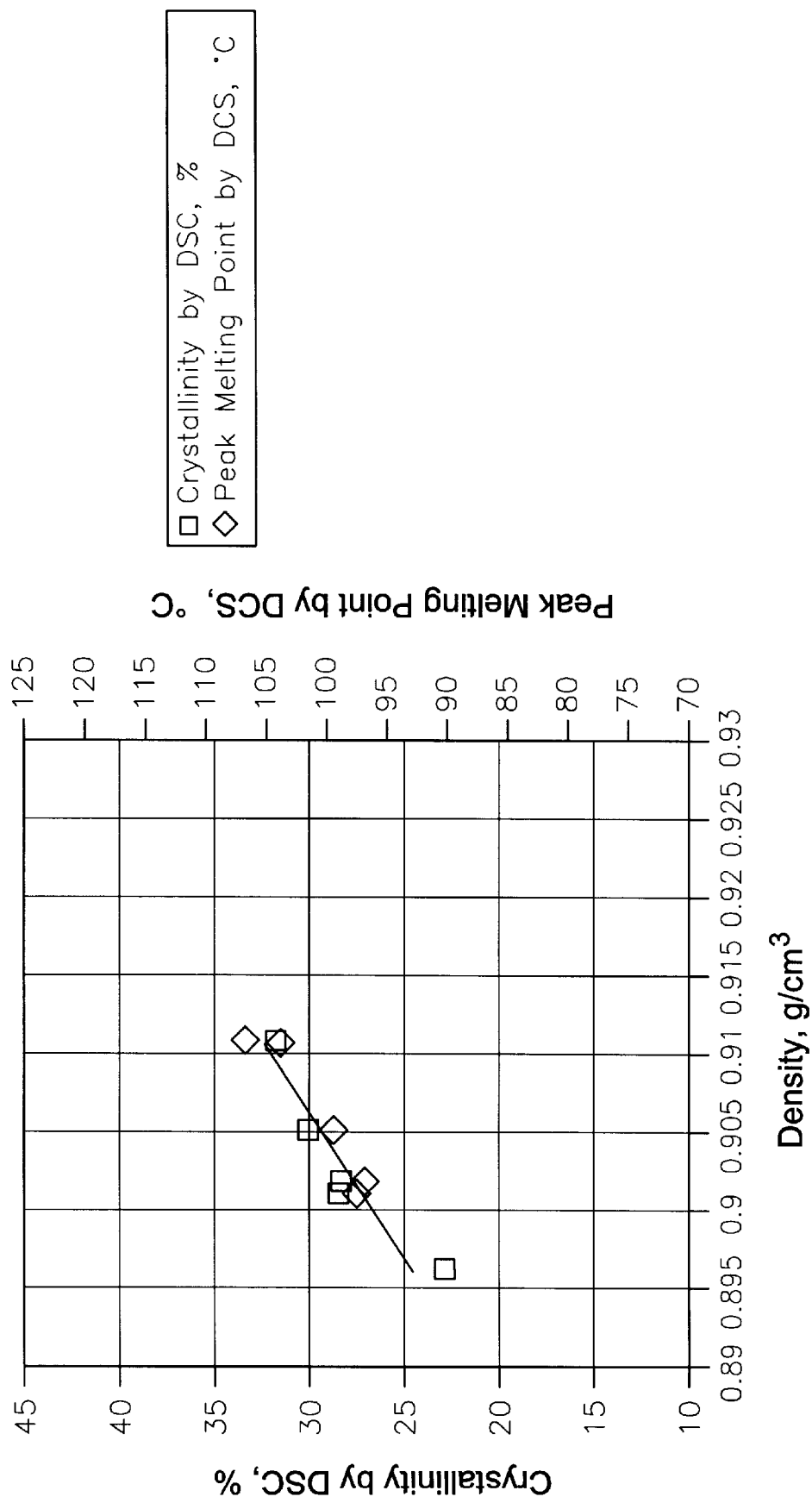
FIG. 2 is a similar three-coordinate plot of peak melting point, crystallinity and density for an ethylene-hexene plastomer.
Figure 3:
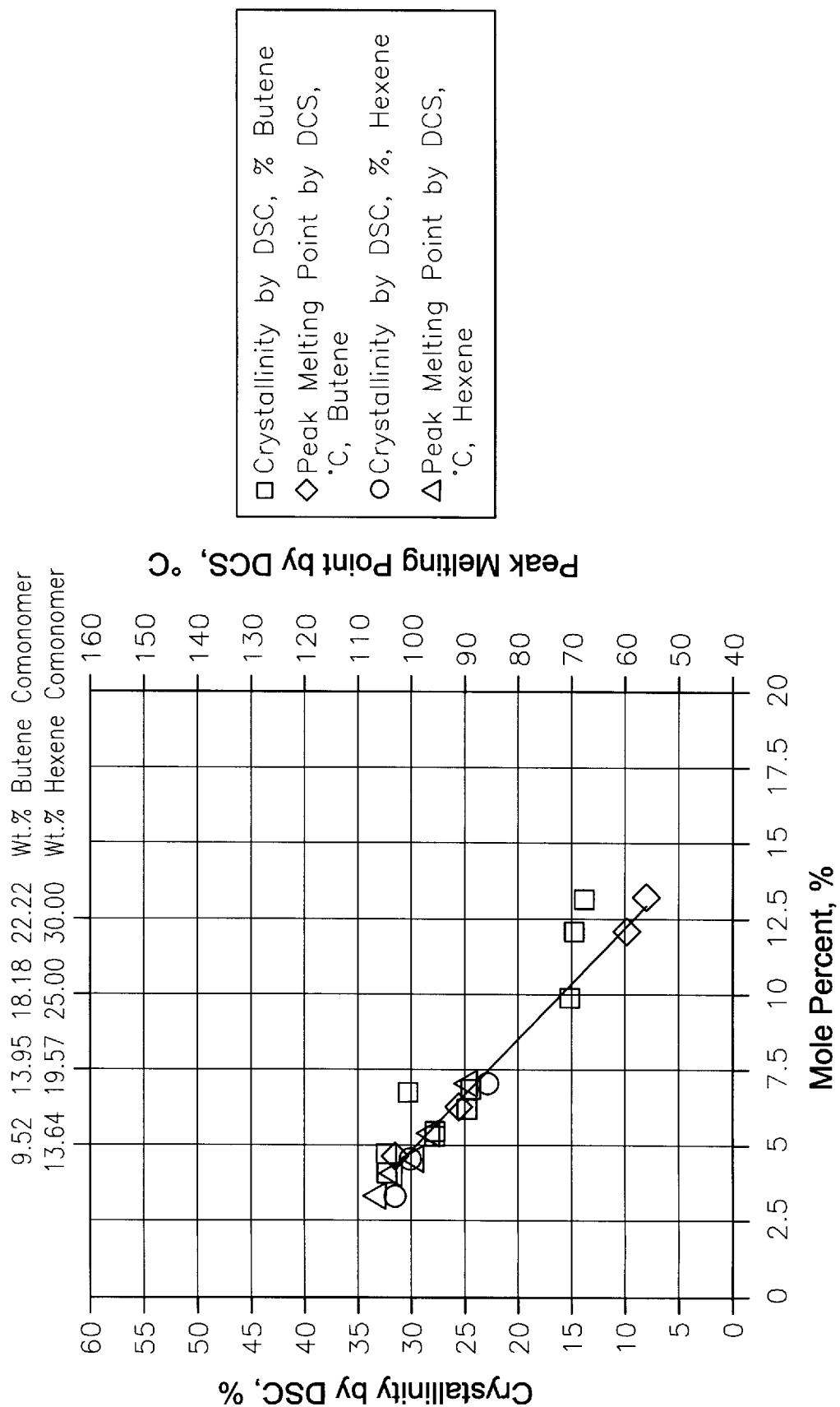
FIG. 3 is a three-coordinate plot of peak melting point and crystallinity against the mole % comonomer content for each of the ethylene-butene and ethylene-hexene plastomers as illustrated and in FIGS. 1 and 2.

Heretofore some ethylene based thermoplastic copolymers have been produced with a Ziegler-Natta type catalyst within this density range, such as very low density polyethylene (VLDPE), that have some attributes in common or overlapping with those of a plastomer—such as commonality of comonomer, such as butene-1, and densities in the region of 0.880 to 0.910 g/cc—yet are distinctly different from a plastomer due to distinctly differing distribution of comonomer between the two types of resin. Hence the behavior of the peak melting point temperature (Tmp) as this relates to comonomer content and density of the prior Ziegler-Natta made VLDPE resins compared to a plastomer are distinctly different. Unlike such prior VLDPE resin, the Tmp of a plastomer resin is substantially linearly related to the comonomer content and density of the plastomer resin such that $\Delta Tmp/\Delta d \geq 900$ (° C./g/cm$^3$) and/or $\Delta Tmp/\Delta$ (comonomer mole %) is about $-5.5$(° C./mole %). See FIGS. 1–3. Such dramatic effects upon the Tmp based upon a change in comonomer content or density have not heretofore been generally observed in VLDPE produced with non-metallocene transition metal catalyst. Further, in contrast to an elastomer resin containing ethylene, regardless of the nature of the catalyst from which the elastomer resin is produced, a plastomer has a higher degree of crystallinity than is typical for an elastomer. Again, see FIGS. 1–3. Unlike an elastomer, a plastomer is relatively non-tacky—that is, it may be formed into pellets that are non-adhesive and relatively free flowing and so are susceptible to dry blending.

For purposes of this application and the claims hereof, a "plastomer" is a copolymer of ethylene and an alpha-olefin comonomer wherein ethylene comprises from about 87 mole % to about 97.5 mole % of the plastomer copolymer; the alpha-olefin comonomer content comprises from about 13 to about 2.5 mole % of the plastomer copolymer and is incorporated into the copolymer in an amount that provides for a density of 0.92 g/cc or less and is limited in an amount so as not to reduce the density to a value less than 0.865 g/cc; and the distribution of the alpha-olefin comonomer within the copolymer is substantially random and also uniform among the differing molecular weight fractions that comprise the ethylene copolymer. This uniformity of comonomer distribution within the plastomer, when expressed as a comonomer distribution breadth index value (CDBI), provides for a CDBI>60, preferably>80 and more preferably>90. Further, the plastomer is characterized by a DSC melting point curve that exhibits the occurrence of a single melting point peak occurring in the region of 50 to 110° C. (second melt rundown), said plastomer copolymer has a weight average molecular value no less than 70,000 and no greater than 130,000, and the plastomer has a molecular weight distribution ($M_w/M_n$) value of $\leq 4.0$ and preferably $\leq 3.5$. Said ethylene copolymer plastomer has a 1% secant modulus not exceeding about 15,000 and as low as about 800 psi or even less.

The preferred plastomers for use in the present invention are those ethylene-based copolymer plastomers sold under the trademark EXACT™, available from Exxon Chemical Company of Houston, Texas. These plastomers are a copolymer of ethylene with a $C_{4-8}$ alpha-olefin comonomer and have a plastic-like molecular weight for better dispersion in the impact modified polypropylene compound of the TPO blend of the invention. Such plastomers, since they are of low tack and form free flowing pellets, are also free of exterior dusting agents and interior processing aids which could adversely affect the properties of the TPO blend. This invention, however, can also be practiced using ENGAGE™ polymers, a line of metallocene catalyzed plastomers available from Dow Chemical Company of Midland, Mich.

As noted, the plastomer component is an ethylene copolymer which is produced with a metallocene catalyst and as such, a plastomer copolymer contains a terminal site of unsaturation, of which advantage can be made through the use of a coupling agent and activator compound, as further explained later. The preferred plastomers have a molecular weight distribution (MWD) in the range of 1.7 to 3.5, and more preferably in the range of 1.8 to 3.0 and most preferably in the range of 1.9 to 2.8. The preferred plastomers have a density in the range of 0.865 to 0.900 g/cc, more preferably in the range of 0.870 to 0.890 g/cc and most preferably in the range of 0.870 to 0.880 g/cc. The comonomer of the plastomer is preferably an acyclic monoolefin such as butene-1, pentene-1, hexene-1, octene-1, or 4-methyl-pentene-1. In some respects, it is desirable for the plastomer to be an ethylene-alpha-olefin-diene terpolymer since incorporation of a quantity of diene monomer into the plastomer provides the plastomer with further residual unsaturation to allow further functionalization and/or cross-linking reactions or coupling of the plastomers in the finished TPO product. In the case of a non-diene containing plastomer the residual or chain end unsaturation, on the basis of the quantity of terminal double bonds per 1,000 carbon atoms, would be of the vinyl type 0.05 to 0.12, of the trans-vinylene type 0.06 to 0.15, and of the vinylene type 0.05 to 0.12.

The Basic Blend Of Impact Modified Polypropylene And Plastomer

The manner in which the plastomer is incorporated into the impact modified polypropylene is not critical, provided it is well dispersed throughout the same. For impact polypropylenes that are prepared as a reactor blend, the plastomer can be incorporated into the resulting impact modified polypropylene by addition of plastomer pellets immediately upstream of the pelletizing extruder. Alternatively, the plastomer may be added to an already pelletized stock of impact modified polypropylene by a converter in a blending process prior to fabricating an end product. Wherein the impact modified polypropylene is itself formed by melt blending of a propylene polymer with an appropriate impact modifying OCE, the plastomer component may also be added at this time and incorporated into the impact modified polypropylene at the time that it itself is prepared by melt blending. Alternatively, the plastomer can be preblended with the impact modifying OCE and the rubber-plastomer pre-blend may later be compounded with the propylene polymer in producing the TPO blend compositions of this invention.

Most generally, in preparing TPO blend compositions of this invention, the impact modified polypropylene resin—which comprises the thermoplastic propylene polymer and its impact modifying olefin copolymer elastomer—comprise from about 60 to about 40 wt. % of the olefin based polymeric resin components of the blend and the plastomer component comprising the ethylene-based copolymer comprises the balance of the olefin-based polymeric resin components of a binary imPP-plastomer TPO blend composition. The proportion of impact modified polypropylene resin component to the plastomer component provides the resulting TPO blend composition with a 1% secant modulus of 40,000 psi or less, preferably 30,000 psi or less, and most preferably 20,000 psi or less.

Optional Discrete OCE Component

Optionally, and preferably so, the TPO blend composition of this invention also incorporates as a third component an olefin copolymer elastomer (OCE) constituent which is discrete from that of the impact modifying OCE for the polypropylene polymer. The discrete olefin copolymer elastomer component may comprise any elastomer having good heat or thermal stability properties and is preferably an ethylene-olefin copolymer elastomer such as ethylene-propylene rubber (EPM) or ethylene-propylene-diene rubber (EPDM); or an isobutylene-paraalkylstyrene copolymer elastomer such as an isobutylene-paramethylstyrene copolymer and its halogenated counterparts such as brominated isobutylene-paramethylstyrene copolymer elastomer. The requirement for the discrete OCE are thermally stable elastomers which can withstand processing temperatures for TPOs, i.e., 330 to 480° F. In addition, these elastomers need to be miscible or compatible with the polypropylene polymer. Examples of elastomers which, although are compatible with polypropylenes, but themselves do not possess sufficient thermal stability are isobutylene-isoprene elastomers and brominated isobutylene-isoprene elastomers (i.e., butyl and halobutyl rubbers). The polyisobutylene elastomer on the other hand can also be utilized. Particularly preferred as an optional discrete olefin copolymer elastomer component of the TPO blend compositions of this invention is a isobutylene-paramethylstyrene copolymer elastomer and its brominated counterparts as described in U.S. Pat. No. 5,162,445. Various grades of such preferred isobutylene-paramethylstyrene copolymer elastomers and brominated isobutylene-paramethylstyrene copolymer elastomers are now available commercially from Exxon Chemical Company of Houston, Tex. In addition, divinylbenzene butyl rubber may be used.

of the plastomer is the brominated isobutylene-paramethylstyrene rubber (EXXPRO 89-1). Due to its lack of backbone unsaturation, it will withstand the TPO processing temperature, and its compatibility is excellent with polypropylene as evident by the sub-micron dispersion of such a rubber in a polypropylene matrix resin. The compatibility between plastomer and this rubber can be improved through grafting of the plastomer through terminal unsaturation to the paramethylstyrene portion of the rubber. Another polymer which may be used as a partial replacement of plastomer is elastic polypropylene. One such polymer is sold under the tradename Rexflex available from Rexene.

Table 1 below illustrates the effect on the final TPO blend of partial replacement of the plastomer component of the blend with a brominated isobutylene-paramethylstyrene copolymer rubber. In Table 1 compositions A, B, C show that replacement of EXACT 4033 with EXXPRO rubber maintained the same amount of stiffness. Due to the incompatibility between EXACT 4033 and EXXPRO, the knitline properties are rather poor. Compositions AA, BB, CC are identical to Compositions A, B and C respectively except proper amount of zinc oxide and zinc stearate (1 parts each per hundred part of EXXPRO) to trigger a grafting reaction. It is evident from the substantial reduction in melt flow rate of Compositions AA, BB, CC that grafting reaction indeed occurred. The main benefit of the grafting reaction is to produce compounds with improved knitline strength, and slight reduction in stiffness was also noticed. Knitline integrity is important in injection molding applications.

TABLE 1

Effect of Rubber Acidition

|  | A | B | C | AA | BB | CC |
|---|---|---|---|---|---|---|
| Composition |  |  |  |  |  |  |
| Escorene PD 8191 | 40 | 40 | 40 | 40 | 40 | 40 |
| EXACT 4033 | 40 | 47.5 | 55 | 40 | 47.5 | 55 |
| EXXPRO 89-1 | 20 | 12.5 | 5 | 20 | 12.5 | 5 |
| Zinc Oxide |  |  |  | 0.2 | 0.12 | 0.05 |
| Zinc Stearate |  |  |  | 0.2 | 0.12 | 0.05 |
| Property |  |  |  |  |  |  |
| Melt Flow Rate, dg/min. | 1.1 | 1 | 1 | 0.2 | 0.1 | 0.9 |
| 1% Secant Modulus, psi | 26630 | 22440 | 23900 | 21630 | 20530 | 22000 |
| Knitline Break Strength, psi | 625 | 660 | 830 | 1208 | 1706 | 1146 |
| Knitline Elongation, % | 15.2 | 52.7 | 122.1 | 548.3 | 964.7 | 547.1 |
| Knitline Energy, In-lbs | 9.5 | 44 | 119 | 620 | 1302 | 584 |

Those grades of isobutylene-paramethylstyrene copolymer elastomer and brominated derivatives thereof most preferred for use as the discrete OCE for forming TPO blends of this invention are the brominated derivatives wherein the paramethylstyrene comonomer is present in an amount of from about 5 to about 10 wt. % and bromine content ranges from about 0.8 to about 2 wt. % of the copolymer elastomer.

Addition of Rubber

Partial replacement of plastomer with a temperature resistant rubber can be practiced to produce low modulus compound. The desirable rubber needs to have good temperature resistance and good degree of compatibility with both polypropylene and plastomer. For example isobutylene-isoprene rubber, although meeting the compatibility requirement, cannot withstand the TPO processing temperature. One rubber which is suitable as a partial replacement Optional Cross-linked Elastomer Concentrate A good thermoformable material is required to have a high melt strength to permit flow under applied stress, and a sufficient elastic memory to resist flow and to retain the embossed grain patterns upon the formed article. Ideally these properties should extend over a wide temperature range to provide a large thermoforming window. However, a basic two component blend of impact modified polypropylene and metallocene plastomer may in some circumstances not have a sufficient melt strength and grain retention capability. Addition of a cross-linked elastomer concentrate is therefore preferred to make a basic two component TPO even more satisfactorily thermoformable.

the same type of TPO skins are sometimes used in a so-called low pressure molding process to produce passenger car doors. In this operation, an embossed TPO skin is first laid inside a door panel mold. Molten polypropylene is next injection molded to fill the back side of the skin. Due to the low pressure nature of this operation, there is a lesser degree of drawing of the TPO skin than thermoforming. A small amount of cross-linked elastomer concentrate would then be sufficient grain pattern wash off in stretched corners.

One such commercially available concentrate is called RC8001, available from advanced Elastomer Systems, L. P. Dynamic mechanical thermal analysis can be used to obtain the complex modulus at a 1 Hz frequency over a 70° C. to 150° C. temperature range as shown in Table A. Due to the cross-linking nature of this material, its storage modulus (E) is found to be rather insensitive to temperature. In contrast to polypropylene or TPO sheeting, softening of this RC 8001 material is accompanied by a retention of its storage modulus. Another compound which can be used is fully compounded, fully cured Santoprene, available from Advanced Elastomer Systems.

TABLE A

Storage Modulus Versus Temperature for RC8001

| Temperature, ° C. | Storage Modulus, Dynes/cm² (×10⁷) |
|---|---|
| 70 | 8.2 |
| 80 | 6.1 |
| 90 | 5.2 |
| 100 | 4.6 |
| 110 | 4.0 |
| 120 | 3.7 |
| 130 | 3.1 |
| 140 | 2.8 |
| 150 | 2.0 |

Examples of crosslinked plastomer concentrates are shown in Table B as Examples E–H.

TABLE B

Examples of Elastomer Concentrates

| Raw Materials | Examples | | | |
|---|---|---|---|---|
| | E | F | G | H |
| Escorene PP 1042 | 20 | 20 | 25 | 20 |
| EXACT 4033 | 40 | 60 | 60 | 40 |
| Vistalon MDV 94-2 | 30 | 10 | 5 | — |
| EXXPRO 89-1 | — | — | — | 30 |
| Drakeol 35 | 10 | 10 | 10 | 10 |
| Varox DBPH-50 | 2 | 2 | 2 | 1 |
| Irganox 1010 | 0.1 | 0.1 | 0.1 | 0.1 |
| Irgafos 168 | 0.1 | 0.1 | 01 | 0.1 |
| Maglite D | 0.1 | 0.1 | 0.1 | 0.1 |
| Zinc Oxide | — | — | — | 0.3 |
| Zinc Stearate | — | — | — | 0.3 |

These example concentrates were produced using an intensive mixer such as a Stewart Bolling #10. The Escorene PP 1042 (a propylene homopolymer of 1.7 melt flow rate); EXACT 4033 (a plastomer of ethylene-butene of 0.880 g/cm³ density and 0.8 melt index) and Vistalon MDV 94-2 (an ethylene-propylene rubber of 0.865 g/cm³ density and 35 Mooney determined at ML(1+4) at 125° C.) were first brought to a flux for two minutes. Drakeol 35, a white mineral oil, was next added to the batch and fluxed for another minute. Varox DBPH-50, a peroxide crosslinking agent [50% 2,5-dimethyl-2,5-di(t-butyl-peroxyl) hexane] was next added and the batch was mixed for another four minutes to complete the crosslinking reaction. In composition H, Varox together with zinc oxide and zinc stearate was added. Finally additives such as Irganox 1010, Irgafos 168 and Maglite D were added and the entire mass was transferred to a downstream extruder, and the batch was reduced into ⅛ inch by ⅛ inch free flowing pellets. The presence of a small quantity of polypropylene (Escorene PP 1042) in the concentrate insured good and quick dispersion of this concentrate into the matrix resin.

Table C shows the storage modulus for these compositions. It is evident from Table C compositions of Examples F and H show higher modulus than RC8001 from 70° C. to 125° C. In the thermoforming temperature range from 120 to 150° C. the modulus of all four elastomer concentrates are essentially the same.

TABLE C

Storage Modulus for Elastomer Concentrates
Dynes/cm² × 10⁷

| Temp., ° C. | RC 8001 | E | F | G | H |
|---|---|---|---|---|---|
| 70.0 | 8.2 | 8.2 | 13.0 | 8.2 | 12.0 |
| 80.0 | 6.1 | 6.0 | 1.0 | 6.0 | 9.0 |
| 90.0 | 5.2 | 5.2 | 8.5 | 5.2 | 7.2 |
| 100.0 | 4.6 | 4.5 | 7.3 | 4.5 | 6.0 |
| 110.0 | 4.0 | 4.0 | 6.4 | 3.9 | 5.0 |
| 120.0 | 3.7 | 3.5 | 5.5 | 3.4 | 4.3 |
| 130.0 | 3.1 | 3.1 | 5.0 | 2.9 | 3.7 |
| 140.0 | 2.8 | 2.7 | 4.1 | 2.5 | 3.0 |
| 150.0 | 2.0 | 2.2 | 3.0 | 1.8 | 2.2 |

The compositions as described in Table D which follows have been found to produce TPO skins for low pressure molding and thermoforming applications with good grain retention.

TABLE D

| Composition | Geomembrane | Low Pressure Molding | Thermoforming | |
|---|---|---|---|---|
| Escorene PD 8191 | 50 | 50 | 50 | 50 |
| EXACT 4033 | 50 | 40 | 25 | 20 |
| RC8001 | | 10 | 25 | 30 |
| Property | | | | |
| Tensile at Break, MD, psi | 7107 | 4440 | 4454 | 2414 |
| Tensile at Break, TD, psi | 8655 | 3580 | 4071 | 2401 |
| Elongation at Break, MD, psi | 649 | 669 | 726 | 728 |
| Elongation at Break, TD, psi | 690 | 693 | 752 | 689 |
| 100% Tensile Modulus, MD, psi | 1471 | 1443 | 1859 | 1082 |
| 100% Tensile Modulus, TD, psi | 1423 | 1198 | 1790 | 1066 |
| 300% Tensile Modulus, MD, psi | 1798 | 1550 | 2031 | 1255 |
| 300% Tensile Modulus, TD, psi | 1648 | 1336 | 1960 | 1234 |
| Tear Strength, MD, Lbs/in | 577 | 363 | 390 | 273 |
| Tear Strength, TD, Lbs/in | 577 | 432 | 373 | 304 |

*MD = Machine Direction *TD = Transverse Direction

Both tensile strength and tear strength show reductions with increased amount of crosslinked rubber concentrate when compared with the basic two-component equal blend of Escorene PD 8191 and EXACT 4033.

Elastomer concentrates such as Examples E, F, G and/or H as described in Table B could be used in part or in whole replacement of the RC 8001 concentrate.

Coupling Agents and Activator Compounds

Optionally, and preferably so, the TPO blend composition of this invention will further comprise a small but effective amount of a multifunctional chemical coupling agent and an activator compound to activate the chemical coupling agent to cause intramolecular coupling of the plastomer component through the coupling agent as a medium and, when present, intermolecular coupling of the plastomer with the optional discrete OCE component, such coupling reactions occurring during melt compounding of the TPO components to form the final TPO blend composition. As previously noted, a metallocene catalyst produced plastomer contains a terminal site of unsaturation and it is through this unsaturation site that the plastomer couples to the coupling agent. Difunctional coupling agents thus yield reaction compositions of the plastomer that are essentially plastomer dimers. Higher functional coupling agents yield higher oligomers of the plastomer.

Chemical coupling agents suitable for use in preparing TPO blend compositions of this invention are alkylphenol-formaldehyde resins such as "SP-1045" by Schenectady Chemicals, 2, 6 bis(hydroxymethyl) cresol supplied by Aldrich Chemical and 2,6,2',6' tetrabismethylol bisphenol A. Suitable activator compounds to activate the coupling agent are stannous chloride. Zinc oxide and zinc stearate combinations may be used to graft plastomers to Exxpol elastomers as well as vulcanizing agents for Exxpol elastomers.

Optional Polyolefin Component

It has further been found that a quantity of low density polyethylene thermoplastic, up to about 30 wt. % of the total TPO blend, may be incorporated to extend the mass of the TPO composition without degrading its desirable properties. Table 2 below illustrates this with respect to a three component blend of imPP/plastomer/LDPE wherein the imPP is Escorene PD 8191 (1% seant modulus 62,500 psi); the plastomer is EXACT 4033 (density of 0.880 g/cm³); and the low density polyethylene is Escorene LD 201.48 (density of 0.923 gtcm³).

TABLE 2

Escorene PD 8191/EXACT 4033/Escorene LD 201.48 Blends

| Sheet properties* | wt. % of imPP/plastomer/LDPE | | | | |
|---|---|---|---|---|---|
| | 60/40/0 | 50/50/0 | 50/40/10 | 40/40/20 | 30/40/30 |
| Tensile at Break, MD, psi | 9475 | 7107 | 8105 | 7504 | 5333 |
| Tensile at Break, TD, psi | 8704 | 8655 | 7298 | 7325 | 4313 |
| Elongation at Break, MD, % | 701 | 649 | 679 | 700 | 651 |
| Elongation at Break, TD, % | 697 | 690 | 688 | 715 | 653 |
| 100% Tensile Modulus, MD, psi | 1713 | 1471 | 1865 | 1786 | 1329 |
| 100% Tensile Modulus, TD, psi | 1654 | 1423 | 1839 | 1663 | 1084 |
| 300% Tensile Modulus, MD, psi | 1992 | 1798 | 2117 | 2068 | 1624 |
| 300% Tensile Modulus, TD, psi | 1840 | 1648 | 1976 | 1921 | 1434 |
| Tear Strength, MD, Lbs/in | 691 | 577 | 638 | 627 | 486 |
| Tear Strength, TD, Lbs/in | 700 | 577 | 593 | 618 | 514 |
| 1% Secant Modulus, psi** | 34323 | 26057 | 30831 | 24967 | 22040 |

*The property values shown were measured on 20 mils thickness unsupported sheet samples produced on a Black Clawson cast line
**Injection molded ASTM Flex Bars
MD = Machine Direction
TD = Transverse Direction Addition of 30% LDPE in formulation still maintains good mechanical properties. Note in the last three columns of data in Table 2, replacement of PD8191 with the less stiff LD 201 in the composition reduces the 1% secant modulus of the material. Since it is not possible to determine 1% secant modulus for sheet samples either the 100% or 300% tensile modulus is used to measure the stiffness of the sheeting. The same conclusions are valid for the compositions illustrated in Table 3 below, wherein the plastomer component employed was EXACT 4049 (density 0.873 g/cm³), and Table 4 below, wherein the plastomer component employed was EXACT SLP9053 (density 0.865 g/cm³).

TABLE 3

Escorene PD 8191/EXACT 4049/Escorene LD 201.48 Blends

| Sheet Properties* | Wt % imPP/plastomer/LDPE | | | |
|---|---|---|---|---|
| | 60/40/0 | 50/50/0 | 50/40/10 | 40/40/20 |
| Tensile at Break, MD, psi | 5481 | 5232 | 4997 | 5678 |
| Tensile at Break, TD, psi | 5136 | 5337 | 5145 | 4955 |
| Elongation at Break, MD, % | 730 | 768 | 942 | 830 |
| Elongation at Break, TD, % | 744 | 824 | 827 | 839 |
| 100% Tensile Modulus, MD, psi | 1648 | 1387 | 1755 | 1693 |
| 100% Tensile Modulus, TD, psi | 1574 | 1332 | 1579 | 1483 |
| 300% Tensile Modulus, MD, psi | 1900 | 1620 | 1879 | 1806 |
| 300% Tensile Modulus, TD, psi | 1760 | 1542 | 1704 | 1697 |
| Tear Strength, MD, Lbs/in | 599 | 506 | 558 | 559 |
| Tear Strength, TD, Lbs/in | 552 | 462 | 536 | 533 |

*The property values shown were measured on 20 mils thickness unsupported sheet samples produced on a Black Clawson cast line
MD = Machine Direction
TD = Transverse Direction

TABLE 4

Escorene PD 8191/EXACT SLP 9053/Escorene LD 201.48 Blends

| Sheet Properties* | Wt. % imPP/plastomer/LDPE | | | |
|---|---|---|---|---|
| | 60/40/0 | 50/50/0 | 50/40/10 | 40/40/20 |
| Tensile at Break, MD, psi | 4827 | 3704 | 4441 | 4517 |
| Tensile at Break, TD, psi | 4301 | 3940 | 4377 | 4394 |
| Elongation at Break, MD, % | 744 | 713 | 759 | 779 |
| Elongation at Break, TD, % | 762 | 902 | 839 | 848 |

TABLE 4-continued

Escorene PD 8191/EXACT SLP 9053/Escorene LD 201.48 Blends

| | Wt. % imPP/plastomer/LDPE | | | |
|---|---|---|---|---|
| Sheet Properties* | 60/40/0 | 50/50/0 | 50/40/10 | 40/40/20 |
| 100% Tensile Modulus, MD, psi | 1516 | 1284 | 1608 | 1552 |
| 100% Tensile Modulus, TD, psi | 1419 | 1121 | 1388 | 1348 |
| 300% Tensile Modulus, MD, psi | 1653 | 1442 | 1759 | 1709 |
| 300% Tensile Modulus, TD, psi | 1607 | 1271 | 1510 | 1528 |
| Tear Strength, MD, Lbs/in | 648 | 481 | 584 | 532 |
| Tear Strength, TD, Lbs/in | 553 | 437 | 488 | 464 |

*The property values shown were measured on 20 mils thickness unsupported sheet samples produced on a Black Clawson cast line
MD = Machine Direction
TD = Transverse Direction Instead of LDPE, other polyethylenes, such as linear low density polyethylene (LLDPE) or high density polyethylene (HDPE), can be used as a replacement for the LDPE in order to adjust the stiffness of the TPO composition. Polyethylene copolymers, such as ethylene vinyl acetate, ethylene methylacrylate and even metal oxide neutralized polyethylene acid copolymers (polyethylene ionomers) can be used to adjust the stiffness of the TPO composition. Further, the impact polypropylene can be partially replaced with a polypropylene homopolymer or a polypropylene random copolymer for stiffness adjustment purposes.

Secant Modulus Effect Of Components

Figure 4:
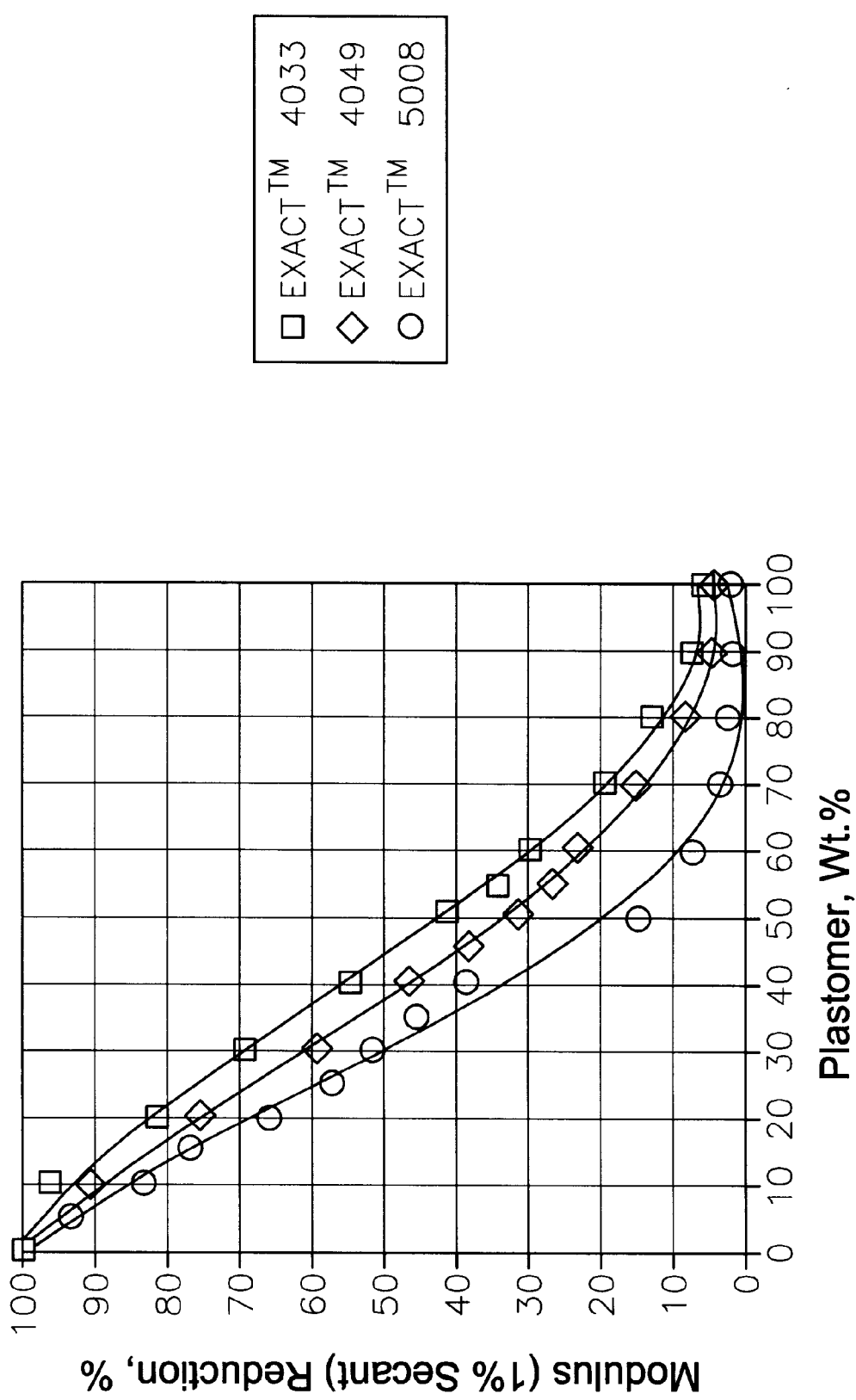
FIG. 4 graphically illustrates the reduction in secant modulus, as a percent of that of the initial secant modulus of an impact modified polypropylene (ESCORENE 8191; 1% secant modulus 62,500 psi), that results from the melt compounding of such impact modified polypropylene with various weight percentages of three types of ethylene-butene plastomer, each plastomer being of a different density (EXACT 4033, density 0.880 g/cm$^3$; EXACT 4049, density 0.873 g/cm$^3$; and EXACT 5008, density 0.865 g/cm$^3$).
Figure 8:
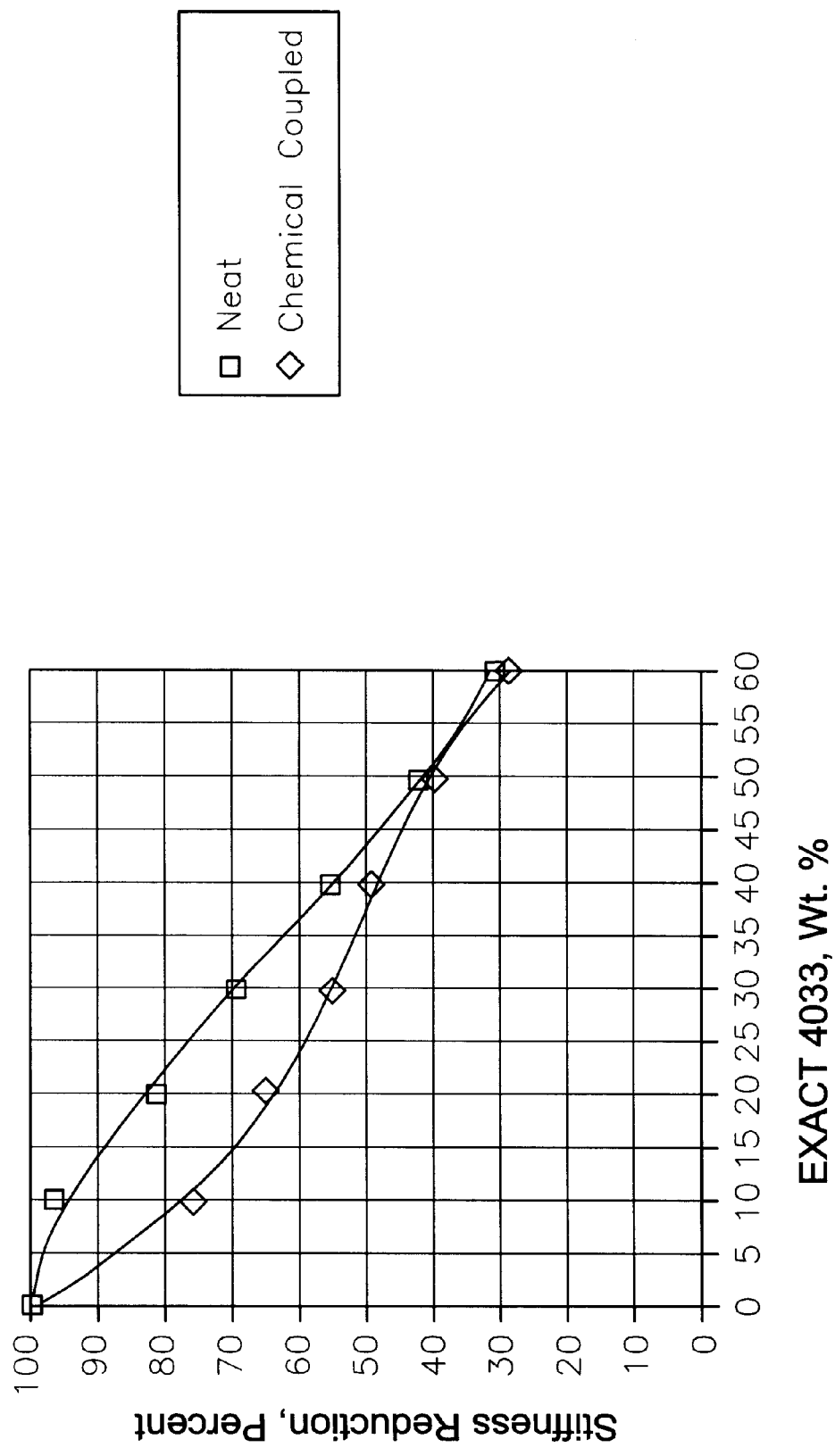
FIG. 8 graphically illustrates the reduction in secant modulus, as a percentage of that of the initial secant modulus of an impact modified polypropylene resin of 1% secant modulus 62,500 psi (ESCORENE 8191), that results from the melt compounding of such impact modified polypropylene with various weight percentages of an ethylene-butene plastomer of density 0.880 g/cm$^3$ (EXACT 4033)alone and also for blends to which a coupling agent, namely an alkyl phenolic resin, and activator compound, namely stannous chloride, were present during melt compounding.
Figure 9:
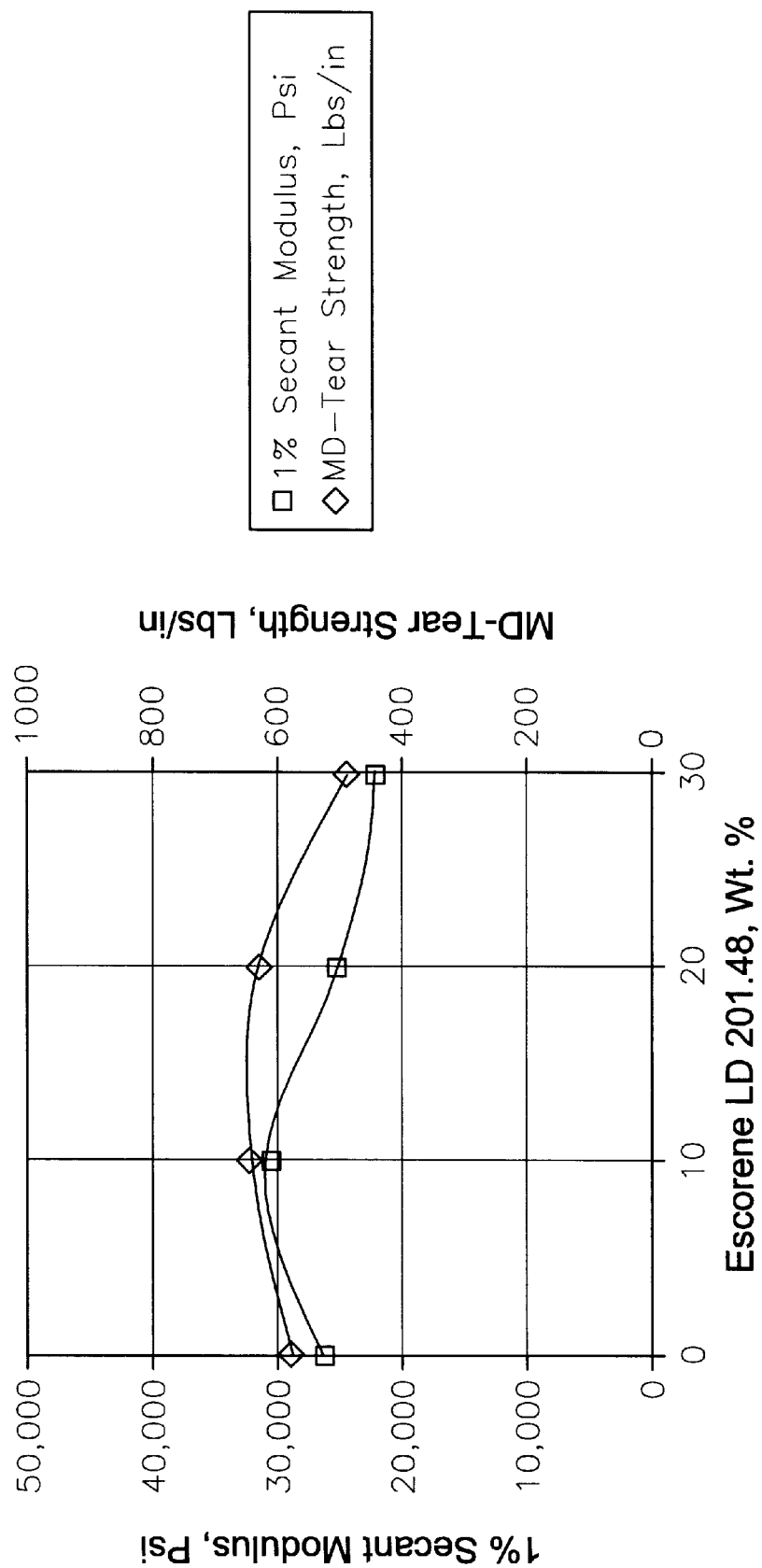
FIG. 9 is a plot of the 1% secant modulus value of a polypropylene-plastomer blend (ESCORENE PD8191 and EXACT 4033) wherein a low density polyethylene (LD201.48) is progressively substituted for a portion of one or both of the polypropylene or plastomer in the following progression: 50/50/0; 50/40/10; 40/40/20; and 30/40/30 under the convention of weight percents of polypropylene/plastomer/low density polyethylene.

It has been found that by intimately incorporating a plastomer of a low 1% secant modulus within an impact modified polypropylene (im PP) having a high 1% secant modulus that the 1% secant modulus of the resulting TPO blend is substantially reduced in essentially direct proportion with the quantity of incorporated plastomer. Further, it has been found that as the density of the plastomer decreases the magnitude by which a given quantity of such plastomer reduces the 1% secant modulus of the final TPO composition increases. Further, as illustrated by FIG. 4, it has been found that when an effective amount of coupling agent and activator compound are incorporated in a blend of impact modified polypropylene and plastomer prior to melt blending of these components that the 1% secant modulus value of the resulting melt compounded TPO blend is still further significantly reduced by comparison to a comparable blend of im-PP and plastomer without coupling agent and activator compound included, as illustrated by FIG. 8. As yet a further means for reducing the 1% secant modulus of the TPO composition a discrete OCE, such as a brominated isobutylene-para-methylstyrene copolymer rubber, when incorporated with the plastomer and coupling agent-activator compound will reduce the 1% secant modulus.

As illustrated by FIG. 4, the percentage by which the 1% secant modulus value of an impact modified polypropylene may be reduced by melt compounding it with a quantity of a plastomer component depends in part upon the density of the plastomer component. At similar weight percentages of a plastomer component, the lower the density of the plastomer, the greater is the percentage of 1% secant modulus value reduction that is accomplished for the resulting blend as compared to the initial 1% secant modulus value of the impact modified polypropylene component of the blend. In the weight percent region of about 10 to about 70 weight percent plastomer, the reduction in 1% secant modulus value is substantially linear.

Figure 5:
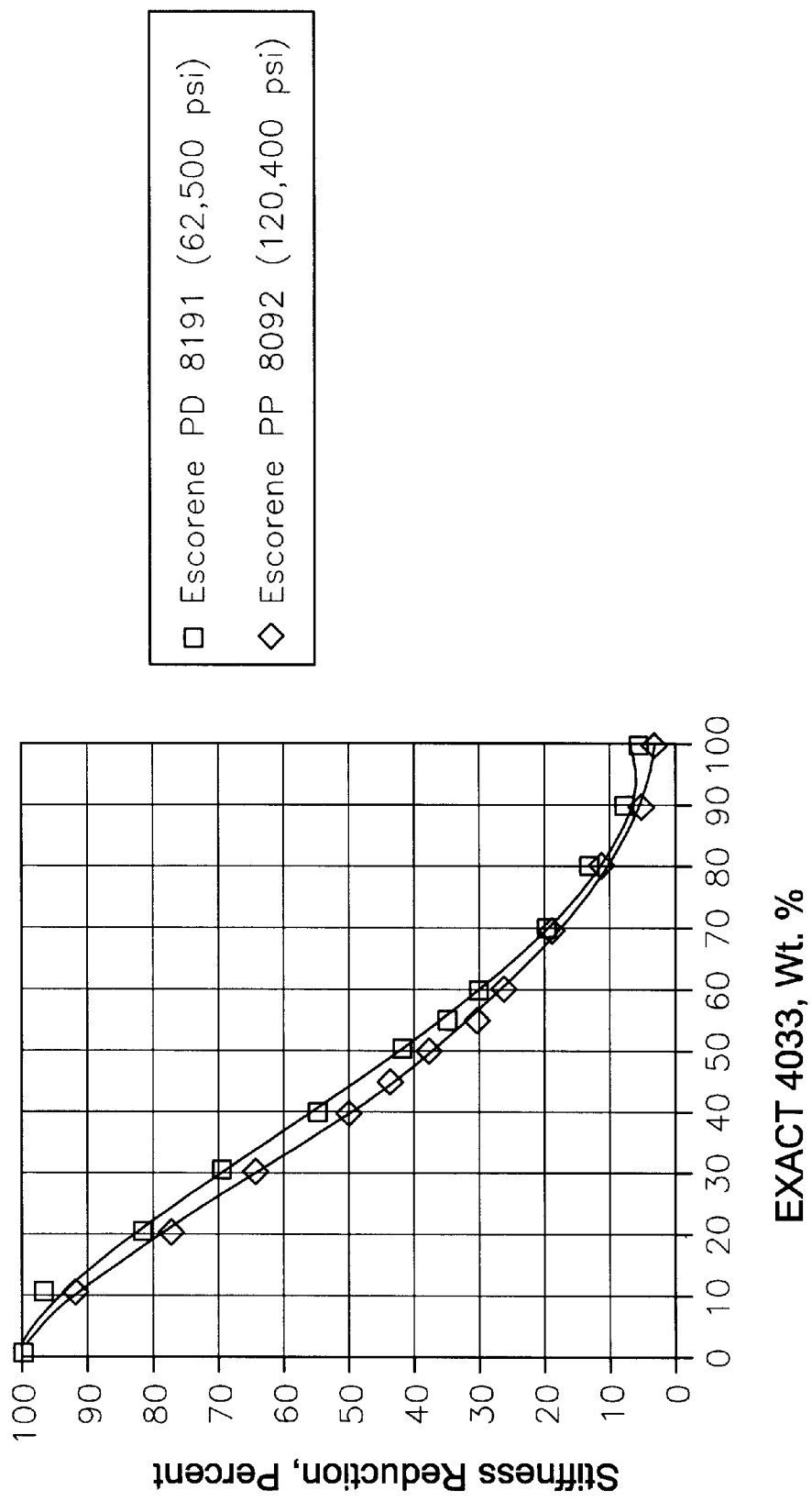
FIG. 5 graphically illustrates the reduction in secant modulus, as a percent of that of the initial secant modulus of each of two different impact modified polypropylene resins each of a different 1% secant modulus value (ESCORENE 8092, 1% secant modulus 120,400 psi; and ESCORENE 8191, 1% secant modulus 62,500 psi), that results from the melt compounding of such impact modified polypropylene resin with various weight percentages of the same ethylene-butene plastomer of a density 0.880 g/cm$^3$ (EXACT 4033).
Figure 6:
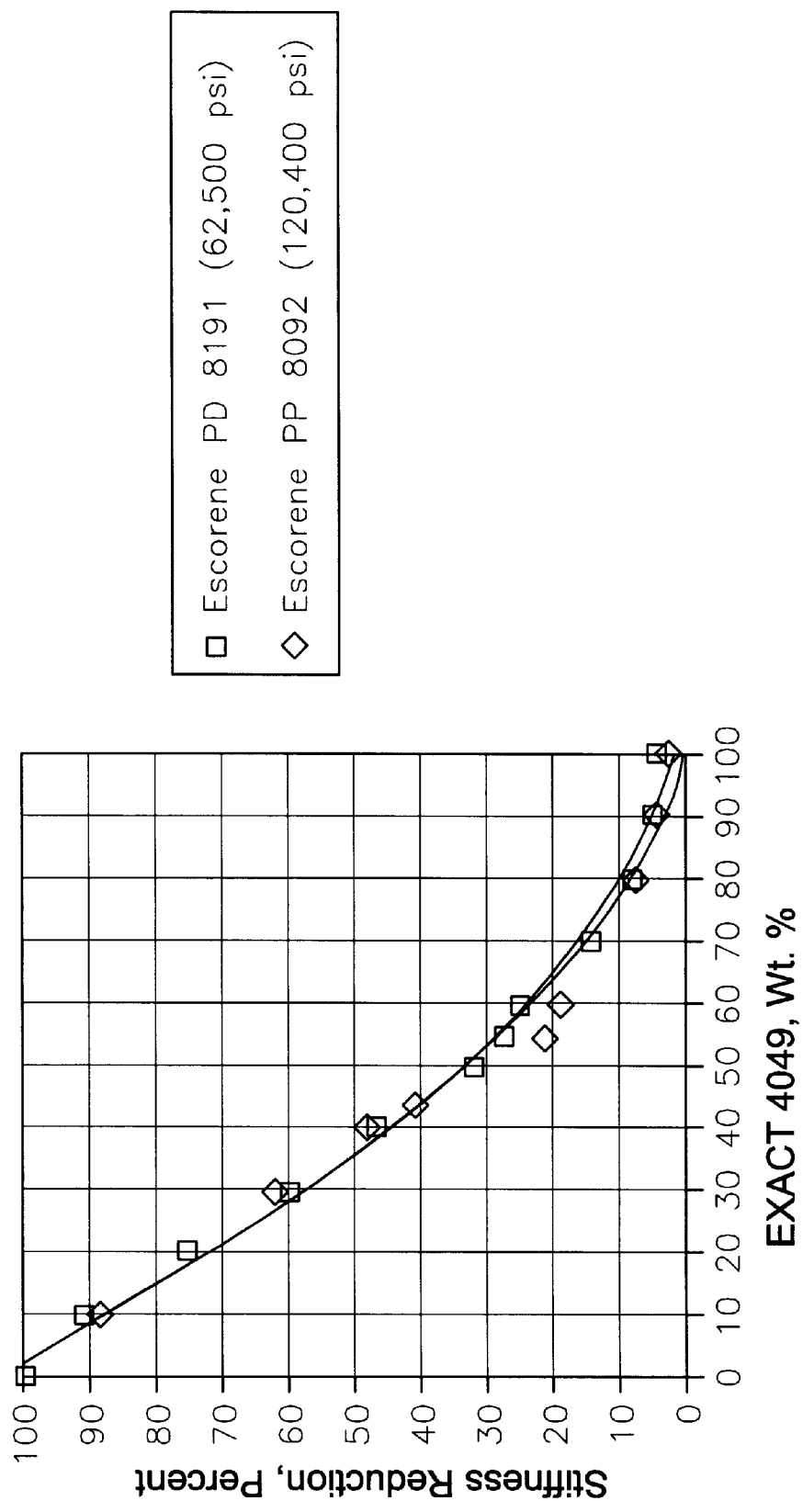
FIG. 6 graphically illustrates the reduction in secant modulus, as a percent of that of the initial secant modulus of each of two different impact modified polypropylene resins each of a different 1% secant modulus value (ESCORENE 8092, 1% secant modulus 120,400 psi; and ESCORENE 8191, 1% secant modulus 62,500 psi), that results from the melt compounding of such impact modified polypropylene resin with various weight percentages of the same ethylene-butene plastomer of a density 0.873 g/cm$^3$ (EXACT 4049).
Figure 7:
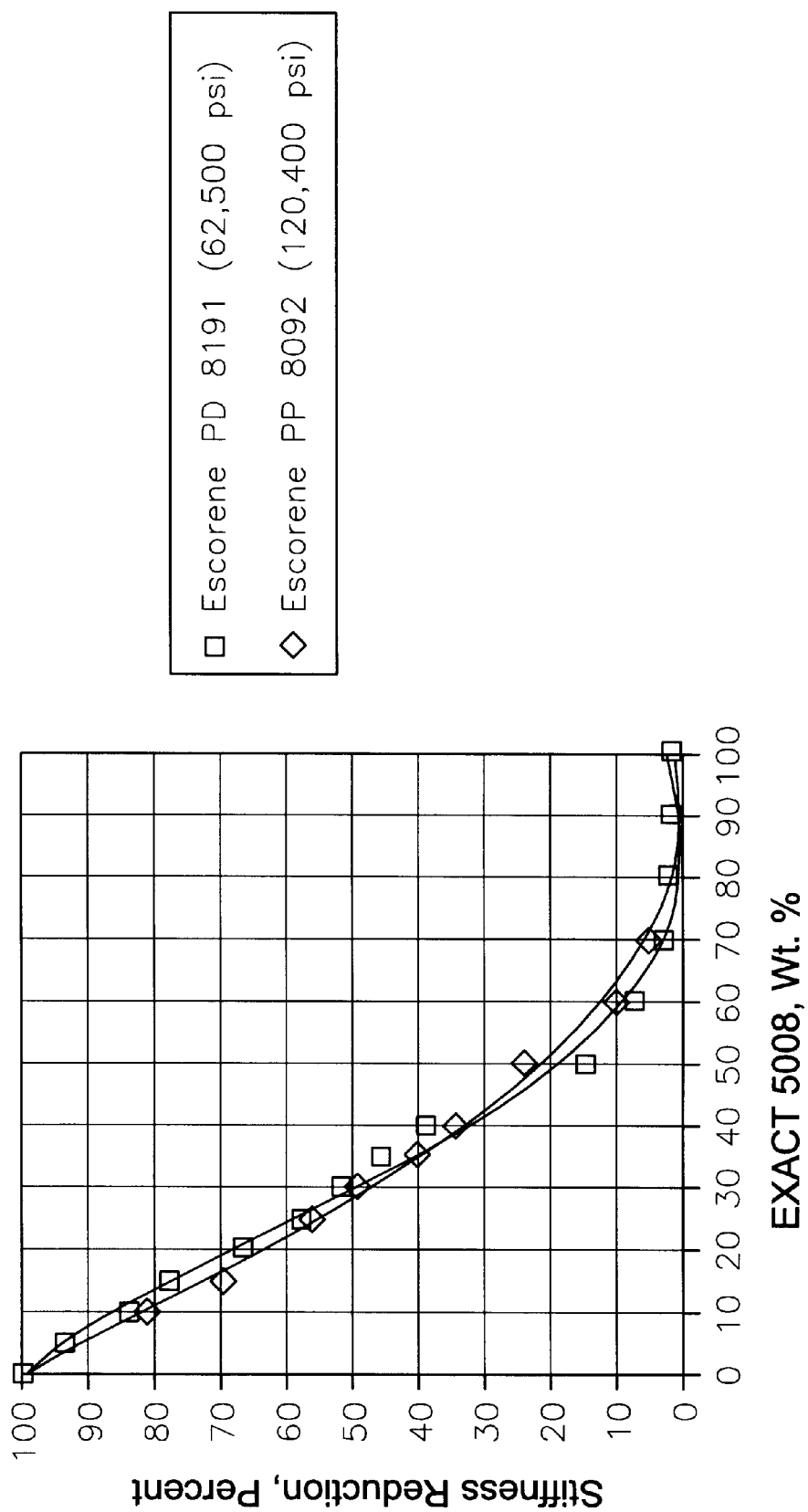
FIG. 7 graphically illustrates the reduction in secant modulus, as a percent of that of the initial secant modulus of each of two different impact modified polypropylene resins each of a different 1% secant modulus value (ESCORENE 8092, 1% secant modulus 120,400 psi; and ESCORENE 8191, 1% secant modulus 62,500 psi), that results from the melt compounding of such impact modified polypropylene resin with various weight percentages of the same ethylene-butene plastomer of a density 0.865 g/cm$^3$ (EXACT 5008).

As further illustrated by FIGS. 5 to 7, as a percentage of the 1% secant modulus value of the impact modified polypropylene component for the blend, the 1% secant modulus value of the resulting blend itself is essentially a function only of the quantity of the plastomer component regardless of the lower or higher nature of the 1% secant modulus value of the impact modified polypropylene component. Accordingly, to achieve a targeted 1% secant modulus value for the final blend resin of 40,000 psi, or more preferably of 30,000 psi or a lesser value as may be desired, the weight percentage quantity of plastomer required to achieve the targeted value may readily be determined given the particulars of the impact modified polypropylene and the plastomer selected for production of the TPO blend. In other words, as illustrated by these FIGS. 4–7, with plastomers of lower densities and impact modified polypropylene components of lower 1% secant modulus values, the lowest wt. % of plastomer component will yield melt compounded blends of the targeted 1% secant modulus value, such as 30,000 psi or even less. On the other hand, with plastomers of the highest densities and impact modified polypropylenes of the highest 1% secant modulus value, the highest weight percentage of plastomer are required to achieve TPO blends of the targeted 1% secant modulus value.

As illustrated by FIG. 8, within a range of 5–40 wt. % of a given plastomer for a given impact modified polypropylene component, the 1% secant modulus value of a resulting melt compounded TPO blend can be significantly reduced in value by employment of a quantity of coupling agent-activator compound during melt compounding of the blend components compared to a blend of the same impact modified polypropylene and plastomer components alone. Table 5 below illustrates this further.

TABLE 5

Effect of Chemical Coupling

| EXACT 4033, Wt. % | Unmodified EXACT 4033 1% Secant Modulus psi (percent of PD 8191 Modulus) | Chemically Coupled EXACT 4033 1% Secant Modulus psi (percent of PD 8191 Modulus) |
|---|---|---|
| 0 | 62525(100) | 62525(100) |
| 10 | 60475(96.72) | 47454(75.90) |
| 20 | 50967(81.51) | 41129(65.78) |
| 30 | 43533(69.63) | 34253(54.78) |
| 40 | 34323(54.89) | 30491(48.77) |
| 50 | 26057(41.67) | 24430(39.07) |
| 60 | 18679(29.87) | 17684(28.28) |

Figure 10:
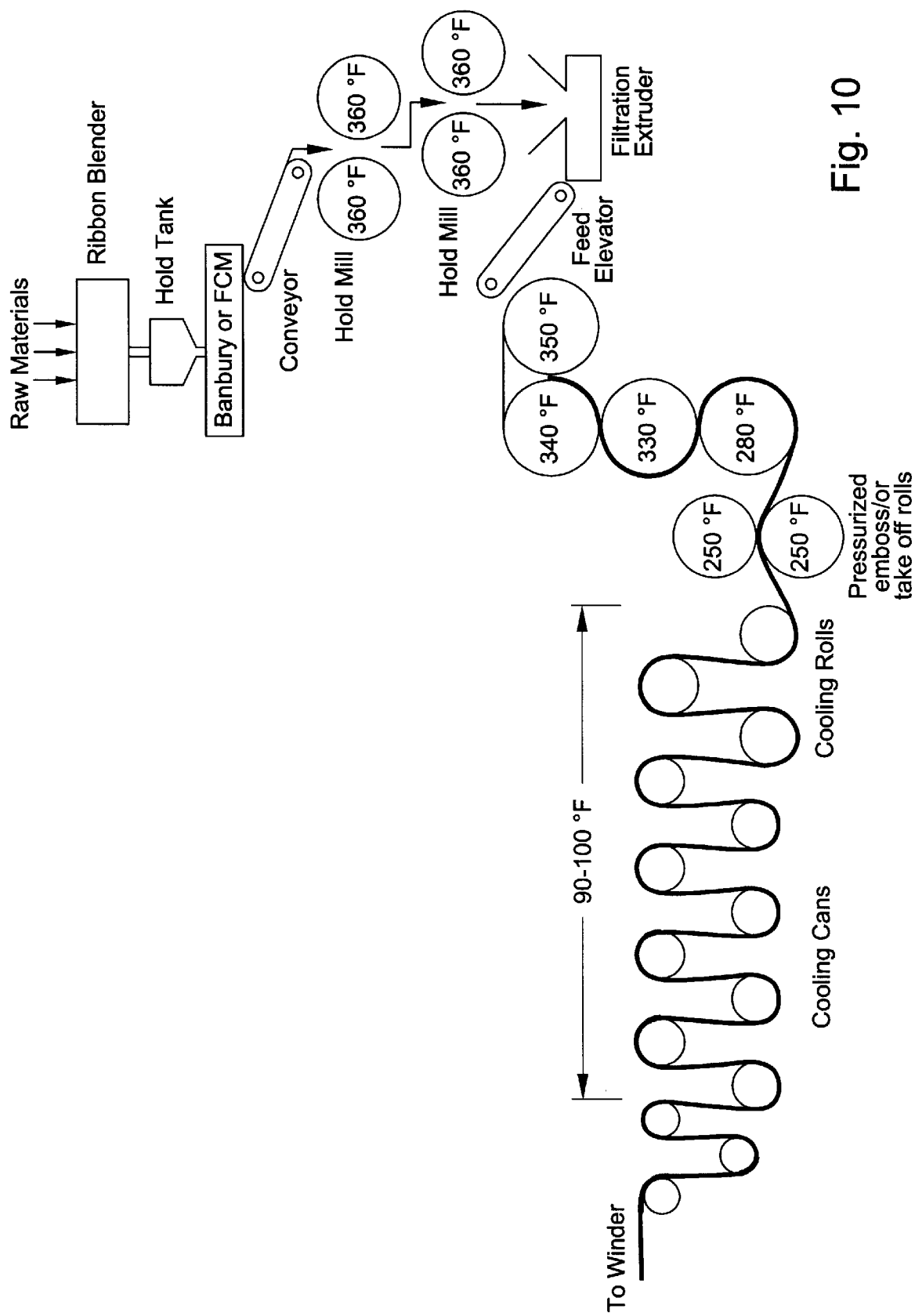
FIG. 10 is a schematic of a calendering line equipped with a set of so-called inverted L calenders.

Fabrication of Skins And Liners Comprised Of The TPO Compositions Of The Invention The compositions of this invention are specially suited for processing on conventional PVC calendering lines with minor adjustments in processing temperatures and rotation speed of calendering rolls. FIG. 10 shows a schematics of a calendering line equipped with a set of so-called inverted L calenders. Raw materials together with heat stabilizers and UV stabilizer and pigment are first dry-blended in a ribbon blender. After a preset mixing time the dry blend is discharged into a hold tank, from which a metered amount of the dry blend is discharged into an intensive mixer to produce a molten batch. The fluxed batch is next conveyed into one or two sets of holding mills in which several batches were homogenized to about 360° F. Afterwards the homogenized batch is forced through a filtering extruder to produce a continuous rod-like feed for the calendering operation. A feed elevator with a swivel feed head is used to feed the molten TPO to the top two calender rolls. The approximate temperatures settings for these calendering rolls may be 280 to 340° F. as shown in FIG. 10. A set of takeoff rolls at about 250° F. are used to strip off the calendered sheeting from the calender stack and feed to a bank of 90 to 100° F. cooling rolls before collection on a continuous winder. The pair of takeoff rolls sometimes are also used to emboss grain patterns or trademarks on the finished sheeting.

Continuous TPO sheeting can also be produced using an extruder to melt the TPO feed. The molten material is forced through a slot die which is placed adjacent to a chrome polished three stack roll to convert TPO into continuous sheeting. The similar TPO composition can also be reduced into 10 to 30 mesh average particle size powders for rotational molding. Finally the rubber concentrate containing compounds show enhanced melt strength over the basic im-PP/EXACT plastomer compounds. They can be used to produce products via either extrusion or extrusion blow molding process.

Figure 11:
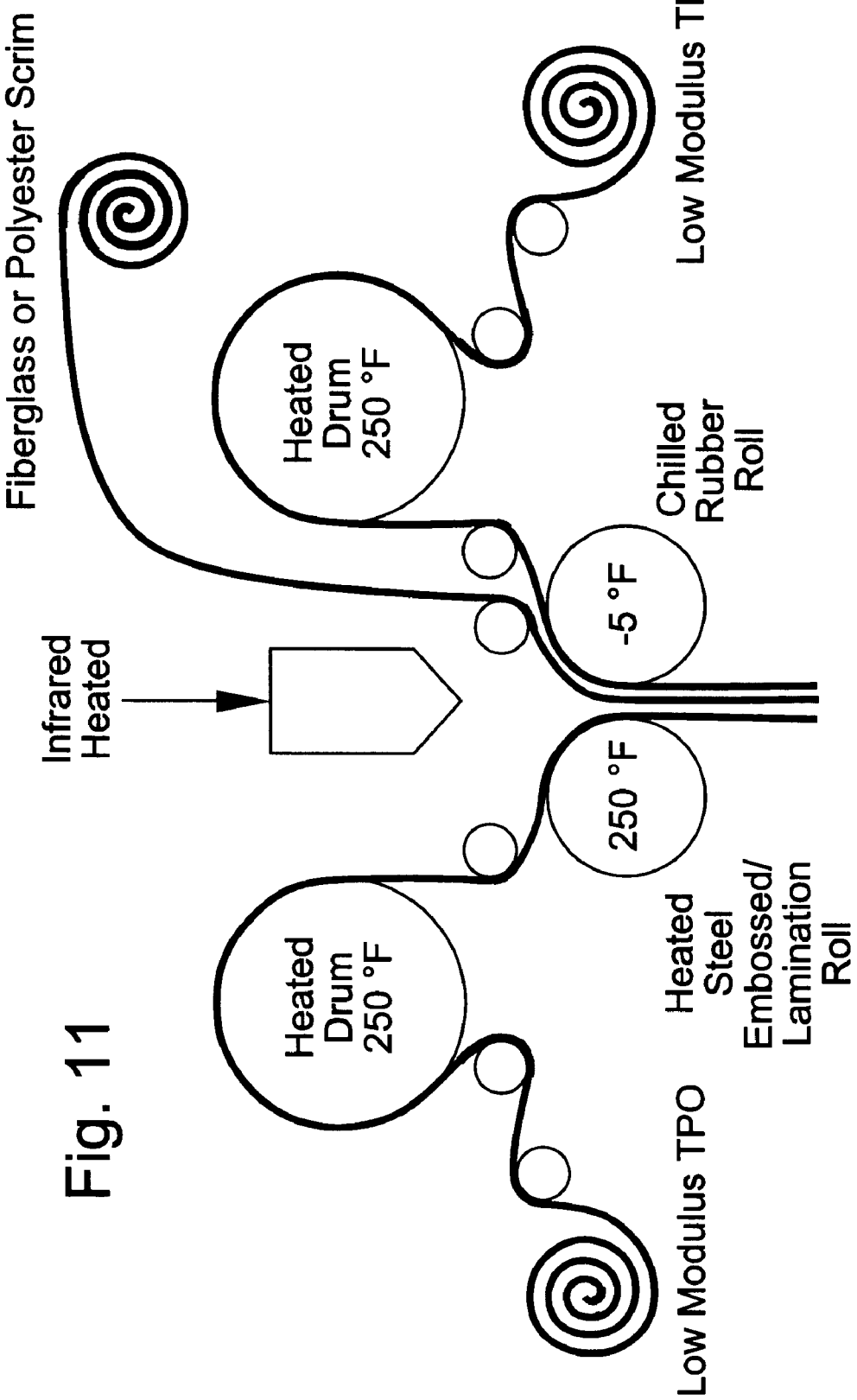
FIG. 11 is a schematic of a typical PVC laminating line.

Either calendered or extruded sheeting can be to produce scrim reinforced industrial liners such as containment liners, or roof membranes on a typical PVC laminator as shown in FIG. 11. Two separate rolls of TPO sheeting are heated by two heated drums and fed through a pair of pressurized lamination rolls. A heated continuous fiberglass or polyester scrim is placed between the TPO sheeting so that the scrim layer is interlocked through thermal bonding by the two TPO sheeting at the lamination rolls.

EXAMPLES

The following tabular data illustrate TPO blend compositions prepared in accordance with this invention. Table 6 hereafter identifies the test method utilized for determining the property of a given blend component or of the TPO blend itself Table 7 hereafter identifies by trade name the propylene based impact modified polypropylene resins utilized in production of Example TPO blend compositions and for each gives the MFR, density and 1% secant modulus values of such impact modified polypropylene. Table 7 hereafter also identifies by trade name the ethylene based plastomer resins utilized in preparing Example TPO blend compositions of this invention and also a LDPE diluent and for each gives the MFR, density and 1% secant modulus values of such plastomers and also identifies the chemical composition, properties and nature of the chain in unsaturation of such plastomers. Table 7 also identifies various elastomers utilized. Table 8 hereafter identifies by trade name or chemical type the coupling agent and activator compound used therefore and supplier thereof for coupling agents and activator compound used in preparing Example TPO blend compositions of this invention. Table 8 also identifies other additives utilized.

TABLE 6

| Test Method | |
| --- | --- |
| Injection Molded Test | Test Method |
| Specimen Property | |
| Melt flow Rate, dg/min | ASTM D-1238 Condition L |
| Melt Index, dg/min | ASTM D-1238 Condition E |
| Density, g/cm$^3$ | ASTM D-792 |
| Hardness, 5 second Shore A | ASTM D-2240 |
| Tensile Strength, psi | ASTM D-638 |
| Elongation, % | ASTM D-638 |
| Knitline Energy, In-lbs | ASTM D-638 |
| Flexural (1% Secant) Modulus, psi | ASTM D-790 |
| Sheeting Property | |
| Tensile Strength, psi | ASTM D-412 |
| Elongation, % | ASTM D-412 |
| Tensile Modulus, psi | ASTM D-412 |
| Tear Strength, lb/in | ASTM D-624 |
| Rubber Property | |
| Mooney Viscosity | ASTM D-1646 |

TABLE 7

| Trade Name | Density, g/cm$^3$ | Melt Flow Rate, dg/min | Comonomer Type | % Secant Modulus, psi | DSC Peak Melting Point, ° C. | Supplier |
| --- | --- | --- | --- | --- | --- | --- |
| POLYPROPYLENE | | | | | | |
| Escorene PD 8191 | 0.9 | 1 | Ethylene | 62530 | 141.6 | Exxon Chemical |
| Escorene PP 8092 | 0.9 | 2 | Ethylene | 120400 | 161.5 | Exxon Chemical |
| Escorene PP 1042 | 0.9 | 1.7 | None | 182400 | 160.5 | Exxon Chemical |
| POLYETHYLENE | | | | | | |
| EXACT 4033 | 0.88 | 0.8 | Butene | 3300 | 60 | Exxon Chemical |
| EXACT 4049 | 0.873 | 4.5 | Butene | 3000 | 55 | Exxon Chemical |
| EXACT 5008 | 0.865 | 10 | Butene | 780 | 45 | Exxon Chemical |
| EXACT SLP 9053 | 0.865 | 4.0 | Butene | 780 | 46 | Exxon Chemical |
| Escorene LD201.48 | 0.923 | 4.1 | None | 34,600 | 112 | Exxon Chemical |

| RUBBER | | | | | |
| --- | --- | --- | --- | --- | --- |
| Trade Name | Density, g/cm$^3$ | Mooney | Comonomer Type | Bromine, Wt. % | Supplier |
| EXXPRO 89-1 | 0.93 | 35 ML (1 + 8) @ 125° C. | Paramethylstyrene | 1.2 | Exxon Chemical |

TABLE 7-continued

| Trade Name | | | | | | |
|---|---|---|---|---|---|---|
| Vistalon MDV 94-2 | 0.865 | 35 ML (1 + 4) @ 125° C. | Ethylene | | None | Exxon Chemical |

RUBBER CONCENTRATE

| Trade Name | Hardness, 5 Sec. | Density, g/cm³ | Tensile Strength, psi | Elongation, % | 100% Tensile Modulus, psi | Supplier |
|---|---|---|---|---|---|---|
| RC 8001 | 48 Shore A | 0.93 | 526 | 367 | 221 | Advanced Elastomer Systems |

TABLE 8

Additive and Chemicals

| Trade Name | Chemical Description | Supplier |
|---|---|---|
| SP-1045 | Alkyl phenol-formaldehyde resin | Schenectady Chemical |
| 2,6 Dimethyl Cresol | 2,6 bis(hydroxymethyl) Crasol | Aldrich Chemical |
| Stannous Chloride | Stannous Chloride | Aldrich Chemical |
| Zinc Oxide | Zinc Oxide | C. P. Hall |
| Zinc Stearate | Zinc Stearate | Harwick |
| Drakeol 35 | White mineral oil | Penreco |
| Varox DBPH-50 | 2,5-dimethyl-2,5-di(t-butyl-peroxy) hexane | R. T. Vanderbilt |
| Irganox 1010 | Tetrakis methylene (3.5-di-t-butyl-4-hydroxygydro-cinnamate) methane | Ciba-Geigy |
| Irgafos 168 | Tris (2,4-di-t-butylphenyl) phosphate | Ciba-Geigy |
| Maglite D | Magnesium Oxide | C. P. Hall |

Example 1

A melt compounded blend of an impact modified polypropylene copolymer (ESCORENE PD8191) and a plastomer (EXACT 4033) in various wt. % proportions of impact modified polypropylene ranging from 90 wt. % to 40 wt. % with plastomer as the balance of the polymeric component of the TPO blend were prepared by melt compounding of the respective resins. The exact identity of the components and the proportions thereof for these blends are reported in Table 5.

Example 2

Blends analogous to those reported above in Example 1, but further incorporating a coupling agent (SP-1045) and an activator compound (Stannous Chloride) with the blend components during melt compounding thereof are also reported in Table 5.

Example 3

Blends analogous to those reported in Example I were prepared wherein as compared to a 60/40 blend of ESCORENE PD8191/EXACT 4033, a LDPE was used to partially replace a portion of the ESCORENE PD8191, and the physical properties of 20 mil thickness sheet samples thereof are reported in Table 2.

Example 4

Blends analogous to those of Example 3 were prepared wherein EXACT 4049 was used instead of EXACT 4033, and the physical properties of 20 mil thickness sheet samples thereof are reported in Table 3.

Example 5

Blends analogous to those of Example 3 were prepared wherein EXACT SLP 9053 replaced EXACT 4033 and results are reported in Table 4.

Example 6

Blends analogous to a 40/60 blend of ESCORENE PD8191 and EXACT 4033 as in Example I were prepared wherein a portion of the EXACT 4033 was progressively replaced with a corresponding quantity of brominated isobutylene-paramethyl(styrene copolymer rubber (EXX PRO 89-1), both with and without the presence of a vulcanizing agent, and the physical properties for such blends are reported in Table 1.

Although the invention has been described by reference to its preferred embodiments those of skill in the art may appreciate from this description changes, modifications or additions that can be made to this invention which do not depart from the scope and spirit of the invention described above or claimed hereafter.

I claim:

1. An article, comprising a layer of at least about 0.005 inch thickness composed of a melt blend of
   (A) an impact modified polypropylene resin composed of a thermoplastic propylene polymer and an impact modifying olefin elastomer copolymer in proportion with respect one to another to provide a resin having a propylene content of 80 wt. % or greater, a 1% secant modulus of about 60,000 to about 130,000 psi, and a melt flow rate of from about 0.5 to about 5;
   (B) a plastomer comprising ethylene copolymerized with an alpha-olefin comonomer wherein said plastomer has an ethylene content of from about 87 to about 97.5 mole %;
       a density of from about 0.865 to about 0.920 g/cc;
       a weight average molecular weight ($M_w$) not less tn 70,000;
       a $M_w/M_n$ equal to or less than 4.0;
       a single melting point peak by DSC in the range of 50 to 110° C.; and
       a 1% secant modulus of less than about 15,000 psi;
   (C) a discreet cross-linked elastomer comprising from about 20 to about 30 wt. % of said blend;
       said impact modified polypropylene resin (A) and said plastomer (B) being in proportions with respect one to another to provide a blend composition having a 1% secant modulus of 40,000 psi or less.

2. The article of claim 1, wherein said plastomer is cross-linked.

3. The article of claim 1, wherein said layer is formed by calendering equipment that is suitable for processing flexible PVC to a layer.

4. A composition, comprising a melt blend of
   (A) an impact modified polypropylene resin composed of a thermoplastic propylene polymer and an impact modifying olefin elastomer copolymer in proportion with respect one to another to provide a resin having a propylene content of 80 wt. % or greater, a 1% secant modulus of about 60,000 to about 130,000 psi, and a melt flow rate of from about 0.5 to about 5;

(B) a plastomer comprising ethylene copolymerized with an alpha-olefin comonomer wherein said plastomer has
an ethylene content of from about 87 to about 97.5 mole %;
a density of from about 0.865 to about 0.920 g/cc;
a weight average molecular weight ($M_w$) not less than 70,000;
a $M_w/M_n$ equal to or less than 4.0;
a single melting point peak by DSC in the range of 50 to 110° C.; and
a 1% secant modulus of less than about 15,000 psi;

(C) a coupling agent and an activator compound;
said impact modified polypropylene resin (A) and said plastomer (B) being in proportions with respect one to another to provide a blend composition having a 1% secant modulus of 40,000 psi or less;
said blend is formed by melt compounding and said plastomer is present in an amount of about 10–40 wt. % and is coupled during melt compounding of said blend components to form the blend; and
wherein said coupling agent is one or more of an alkylphenol-formaldehyde, and a combination of zinc oxide and zinc stearate.

5. An article, comprising
a layer of at least about 0.005 inch thickness said layer formed by calendering equipment that is suitable for processing flexible PVC to a layer composed of a melt blend of
(A) an impact modified polypropylene resin composed of a thermoplastic propylene polymer and an impact modifying olefin elastomer copolymer in proportion with respect one to another to provide a resin having a propylene content of 80 wt. % or greater, a 1% secant modulus of about 60,000 to about 130,000 psi, and a melt flow rate of from about 0.5 to about 5;
(B) a plastomer comprising ethylene copolymerized with an alpha-olefin comonomer wherein said plastomer has
an ethylene content of from about 87 to about 97.5 mole %;
a density of from about 0.865 to about 0.920 g/cc;
a weight average molecular weight ($M_w$) not less than 70,000;
a $M_w/M_n$ equal to or less than 4.0;
a single melting point peak by DSC in the range of 50 to 110° C.; and
a 1% secant modulus of less than about 15,000 psi;
(C) a discrete cross-linked elastomer comprising from about 20 to about 30 wt. % of said blend;
said impact modified polypropylene resin (A) and said plastomer (B) being in proportions with respect one to another to provide a blend composition having a 1% secant modulus of 40,000 psi or less.

6. A composition, comprising a melt blend of
(A) an impact modified polypropylene resin composed of a thermoplastic propylene polymer and an impact modifying olefin elastomer copolymer in proportion with respect one to another to provide a resin having a propylene content of 80 wt. % or greater, a 1% secant modulus of about 60,000 to about 130,000 psi, and a melt flow rate of from about 0.5 to about 5;
(B) a plastomer comprising ethylene copolymerized with an alpha-olefin comonomer wherein said plastomer has
an ethylene content of from about 87 to about 97.5 mole %;
a density of from about 0.865 to about 0.920 g/cc;
a weight average molecular weight ($M_w$) not less than 70,000;
a $M_w/M_n$ equal to or less than 4.0;
a single melting point peak by DSC in the range of 50 to 110° C.; and
a 1% secant modulus of less than about 15,000 psi;
(C) a discrete cross-linked elastomer concentrate comprises up to about 30 wt. % of said blend;
said impact modified polypropylene resin (A) and said plastomer (B) being in proportions with respect one to another to provide a blend composition having a 1% secant modulus of 40,000 psi or less.

7. A composition comprising a melt blend of:
(a) an impact modified polypropylene resin comprising a thermoplastic propylene polymer and an impact modifying olefin elastomer copolymer in proportion with respect one to another to provide a resin having a propylene content of 80 wt % or greater, a 1% secant modulus of about 60,000 to about 130,000 psi, and a melt flow rate of from about 0.5 to about 5;
(b) a plastomer comprising ethylene copolymerized with an alpha-olefin comonomer, wherein said plastomer has:
an ethylene content of from about 87 to about 97.5 mol %;
a density of from about 0.865 to about 0.920 g/cm³;
a weight average molecular weight ($M_w$) not less than 70,000;
a $M_w/M_n$ equal to or less than 4.0;
a single melting point peak by DSC in the range of 50 to 110° C.; and
a 1% secant modulus of less than about 15,000 psi;
(c) a discrete olefin copolymer elastomer present in an amount of from about 5 to about 20 wt % of the blend; and
(d) a coupling agent and an activator compound;
wherein the impact modified polypropylene resin and the plastomer are present in proportion with respect one to another to provide a blend composition having a 1% secant modulus of 40,000 psi or less, the blend is formed by melt compounding, and the plastomer and the discrete olefin copolymer elastomer are coupled during melt compounding of the blend components to form the blend.

8. The composition of any of claims 4, 6 or 7, wherein said blend has a 1% secant modulus of 30,000 psi or less and wherein said plastomer has a 1% secant modulus of 5,000 psi or less.

9. The composition of claims 4, 6 or 7, wherein said blend has a 1% secant modulus of 20,000 psi or less.

* * * * *